US012169066B2

(12) United States Patent
Bretschneider

(10) Patent No.: US 12,169,066 B2
(45) Date of Patent: Dec. 17, 2024

(54) ILLUMINATION DEVICE WITH ELONGATED OPTICAL ELEMENT WITH AT LEAST ONE CAVITY

(71) Applicant: Quarkstar LLC, Las Vegas, NV (US)

(72) Inventor: Eric Bretschneider, Corinth, TX (US)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 17/282,362

(22) PCT Filed: Sep. 27, 2019

(86) PCT No.: PCT/US2019/053671

§ 371 (c)(1),
(2) Date: Apr. 1, 2021

(87) PCT Pub. No.: WO2020/072330

PCT Pub. Date: Apr. 9, 2020

(65) Prior Publication Data

US 2021/0381675 A1 Dec. 9, 2021

Related U.S. Application Data

(60) Provisional application No. 62/741,493, filed on Oct. 4, 2018.

(51) Int. Cl.
*F21V 5/04* (2006.01)
*F21S 4/20* (2016.01)
(Continued)

(52) U.S. Cl.
CPC ................ *F21V 5/043* (2013.01); *F21S 4/20* (2016.01); *F21Y 2103/10* (2016.08); *F21Y 2103/30* (2016.08); *F21Y 2115/10* (2016.08)

(58) Field of Classification Search
CPC .. F21V 5/043; F21Y 2103/10; F21Y 2103/30; F21Y 2103/33; F21Y 2103/37; F21Y 2105/18; F21S 4/20; G02B 3/06
See application file for complete search history.

(56) References Cited

U.S. PATENT DOCUMENTS 3,287,551 A * 11/1966 Dick ..................... F21S 41/125 362/216
4,767,172 A * 8/1988 Nichols ................ G02B 6/4214 355/1

(Continued)

FOREIGN PATENT DOCUMENTS

EP 3418621 A1 * 12/2018 ............. B29D 11/00
JP 2009158533 A 7/2009

(Continued)

OTHER PUBLICATIONS

International Application No. PCT/US2019/053671, Notification of Transmittal of the International Search Report and the Written Opinion of the International Searching Authority, mailed Jan. 8, 2020, 14 pages.

*Primary Examiner* — Ismael Negron
(74) *Attorney, Agent, or Firm* — Fish & Richardson P.C.

(57) ABSTRACT

An illumination device includes multiple light-emitting elements operatively arranged to emit light during operation, and a transparent elongate optical element including one or more cavities. The optical element is arranged to receive light from the light-emitting elements. The one or more cavities are arranged along an extension of the optical element.

13 Claims, 29 Drawing Sheets

(51) Int. Cl.

| | |
|---|---|
| *F21Y 103/10* | (2016.01) |
| *F21Y 103/30* | (2016.01) |
| *F21Y 115/10* | (2016.01) |

(56) References Cited

U.S. PATENT DOCUMENTS

| | | | | |
|---|---|---|---|---|
| 5,526,190 | A * | 6/1996 | Hubble, III | G02B 3/06 359/708 |
| 6,050,700 | A * | 4/2000 | Satterfield | F21S 8/031 362/217.13 |
| 6,361,186 | B1 * | 3/2002 | Slayden | F21V 3/0625 362/240 |
| 7,132,785 | B2 | 11/2006 | Ducharme | |
| 7,213,941 | B2 | 5/2007 | Sloan et al. | |
| 7,857,482 | B2 | 12/2010 | Reo et al. | |
| 8,177,391 | B2 * | 5/2012 | Ryu | F21V 5/04 362/249.02 |
| 8,186,847 | B2 | 5/2012 | Hu et al. | |
| 8,449,140 | B2 | 5/2013 | Martin et al. | |
| 8,748,905 | B2 | 6/2014 | Hussell et al. | |
| 8,876,325 | B2 * | 11/2014 | Lu | G02B 19/0066 362/249.02 |
| 9,057,807 | B2 | 6/2015 | Yoo et al. | |
| 9,494,293 | B2 * | 11/2016 | Pickard | F21V 5/04 |
| 9,719,637 | B2 * | 8/2017 | Boonekamp | F21V 29/70 |
| 9,976,708 | B2 * | 5/2018 | Sobczyk | F21V 3/02 |
| 10,274,166 | B2 * | 4/2019 | Li | F21V 3/12 |
| 10,344,925 | B2 * | 7/2019 | Siltanen | F21S 8/03 |
| 10,883,701 | B2 * | 1/2021 | Wang | F21S 8/026 |
| 11,199,305 | B2 * | 12/2021 | Xu | F21V 5/008 |
| 11,248,758 | B2 * | 2/2022 | Shen | H01L 33/58 |
| 2007/0064409 | A1 | 3/2007 | Hulse | |
| 2008/0211429 | A1 * | 9/2008 | Saito | F21K 9/61 315/312 |
| 2011/0140589 | A1 | 6/2011 | Daniel | |
| 2011/0305024 | A1 * | 12/2011 | Chang | F21V 5/02 362/294 |
| 2014/0198496 | A1 * | 7/2014 | Ye | F21V 21/00 362/311.01 |
| 2015/0145406 | A1 * | 5/2015 | Li | F21K 9/232 264/1.7 |
| 2015/0168626 | A1 | 6/2015 | Schinagl | |
| 2015/0345743 | A1 * | 12/2015 | Trincia | F21V 15/01 362/217.05 |
| 2020/0326057 | A1 * | 10/2020 | Chen | F21V 19/0095 |

FOREIGN PATENT DOCUMENTS

| | | | | |
|---|---|---|---|---|
| WO | WO2009064472 | A1 | 5/2009 | |
| WO | WO2011091615 | A1 | 8/2011 | |
| WO | WO-2013057632 | A1 * | 4/2013 | F21V 5/046 |
| WO | WO-2014155224 | A1 * | 10/2014 | F21V 23/003 |
| WO | WO-2016156138 | A1 * | 10/2016 | G02B 6/0048 |

* cited by examiner

US 12,169,066 B2

ILLUMINATION DEVICE WITH ELONGATED OPTICAL ELEMENT WITH AT LEAST ONE CAVITY

FIELD OF TECHNOLOGY

The present technology relates to compact illumination devices and compact illumination devices with spatially controllable light emission, in particular compact illumination devices based on elongate optics.

BACKGROUND

The emission pattern of light from LED packages seldom if ever matches the distribution pattern required for lighting applications. This is particularly true for lighting applications that require well controlled distributions of light characterized by narrow beam angles or changes in intensity that vary significantly over small angles. The optics required for these types of light distributions have been both large and had complicated geometries. As such, configurations of illumination devices provide limited flexibility to adapt to different lighting applications and are typically anything but compact in size. Changing the spatial distribution of the light emission during operation of such illumination devices often requires arrangements of multiple optical components that are movable relative to each other and may employ elaborate mechanisms. As such there has been a long-felt need to mitigate this situation.

SUMMARY

In a first innovative aspect, an illumination device includes multiple light-emitting elements (LEEs); and a transparent elongate optical element including one or more cavities arranged along an elongation of the optical element. The optical element is arranged to receive light from the LEEs along the elongation.

The foregoing and other embodiments can each optionally include one or more of the following features, alone or in combination. In some implementations, the optical element extends along a curvilinear path. In some implementations, the optical element has a tubular shape with one cavity extending along a full elongate extension of the optical element.

In some implementations, the optical element has a closed annular shape. Here, the optical element includes a plurality of indentations optically coupled with the LEEs. Alternatively or additionally, the optical element includes a groove arranged along the extension of the optical element and optically coupled with the LEEs. In some implementations, the multiple LEEs are operatively arranged on a planar substrate.

In some implementations, the illumination device includes one or more phosphor elements arranged to receive light from the LEEs and configured to convert at least a portion of the received light into light having a second spectral power distribution different from a first spectral power distribution of the received light. Here, the optical element comprises one or more indentations and the phosphor elements are arranged in the one or more indentations. For example, the one or more indentations are one groove extending along the extension of the optical element, and the one or more phosphor elements are one contiguous phosphor element arranged within the groove. Further here, the phosphor element and the LEEs are separated by a gap.

In some implementations when the optical element has a tubular shape with one cavity extending along a full elongate extension of the optical element, both the optical element and cavity have circular sections in planes perpendicular to the elongate extension of the optical element. In some implementations when the optical element has a tubular shape with one cavity extending along a full elongate extension of the optical element, in planes perpendicular to the elongate extension of the optical element, sections of the optical element and the cavity are concentric. In some implementations when the optical element has a tubular shape with one cavity extending along a full elongate extension of the optical element, in planes perpendicular to the elongate extension of the optical element, sections of the optical element and the cavity are eccentric. Here, the section of the cavity is offset from a section of the optical element toward the LEEs. Alternatively or additionally, the section of the cavity is offset from a section of the optical element in a direction including an angle other than zero relative to a direction toward the LEEs. In some implementations when the optical element has a tubular shape with one cavity extending along a full elongate extension of the optical element, the cavity has a circular section.

In some implementations, the optical element has a circular section. In some implementations, the LEEs are spaced apart from the optical element.

In another innovative aspect, an illumination device includes multiple light-emitting elements (LEEs); and a transparent tubular optical element including a tubular cavity extending along an elongation of the optical element. The optical element is arranged to receive light from the LEEs along the elongation.

In yet another innovative aspect, an illumination device includes multiple light-emitting elements (LEEs); and a transparent elongate optical element having an elliptical section perpendicular to an elongation thereof. The optical element is arranged to receive light from the LEEs along the elongation.

The foregoing and other embodiments can each optionally include one or more of the following features, alone or in combination. In some implementations, axes of the LEEs coincide with an axis of the elliptical section of the optical element. In some implementations, axes of the LEEs differ from axes of the elliptical section of the optical element. In some implementations, the LEEs are spaced apart from the optical element.

The details of one or more implementations of the technologies described herein are set forth in the accompanying drawings and the description below. Other features, aspects, and advantages of the disclosed technologies will become apparent from the description, the drawings, and the claims.

Each of FIGS. 4B, 4C, 4D, 4E, 4F and 4G shows a cross-section view of an illumination device which includes a transparent elongate optical element having an elliptical cross-section perpendicular to an elongation thereof, and one or more LEEs optically coupled with the optical element and arranged to emit light along a direction forming a respective acute angle with a first axis of the elliptical cross-section.

Figure 4A:
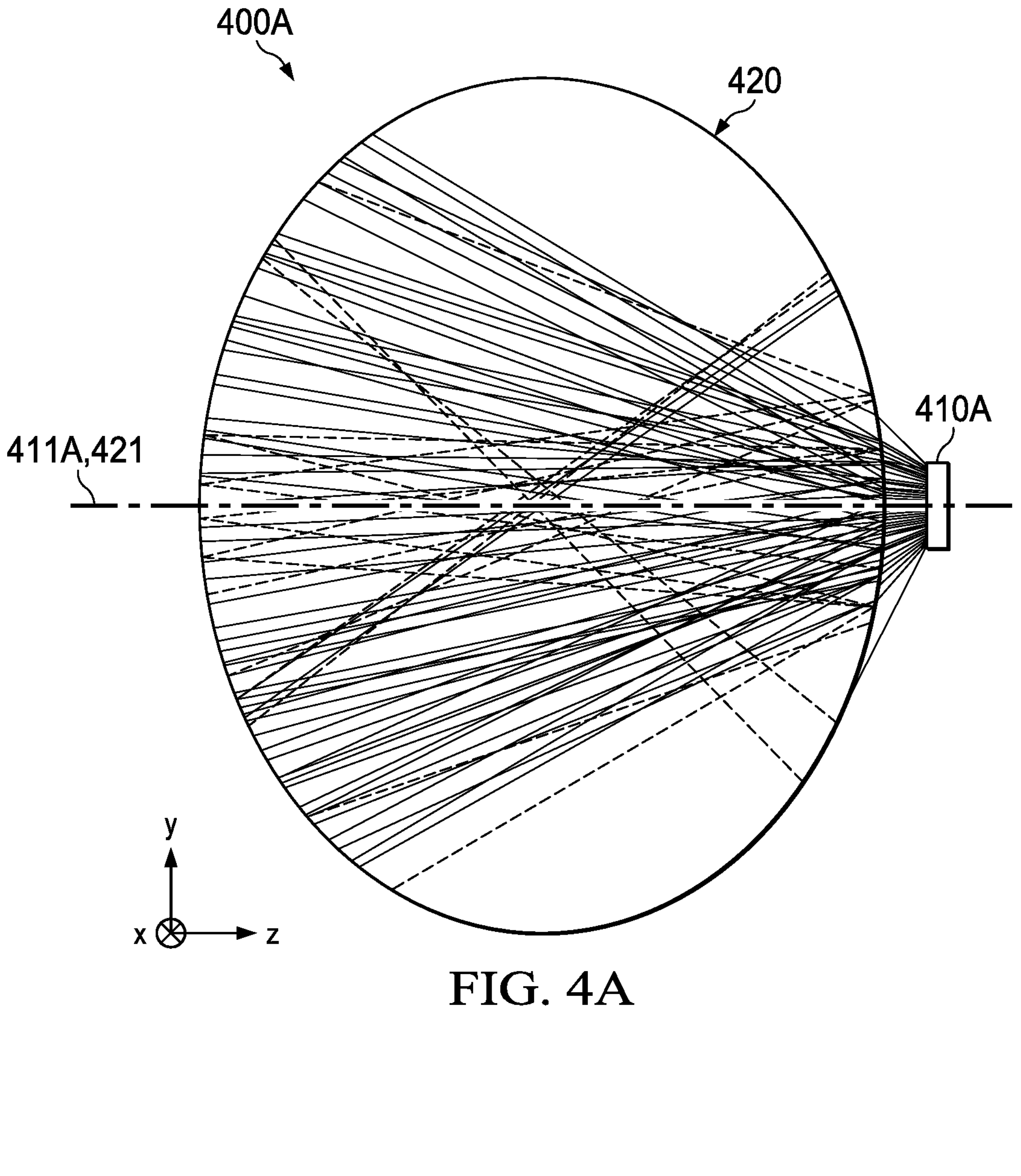
FIG. 4A shows a cross-section view of an illumination device which includes a transparent elongate optical element having an elliptical cross-section perpendicular to an elongation thereof, and one or more LEEs optically coupled with the optical element and arranged to emit light along a direction parallel to a first axis of the elliptical cross-section.
Figure 4B:
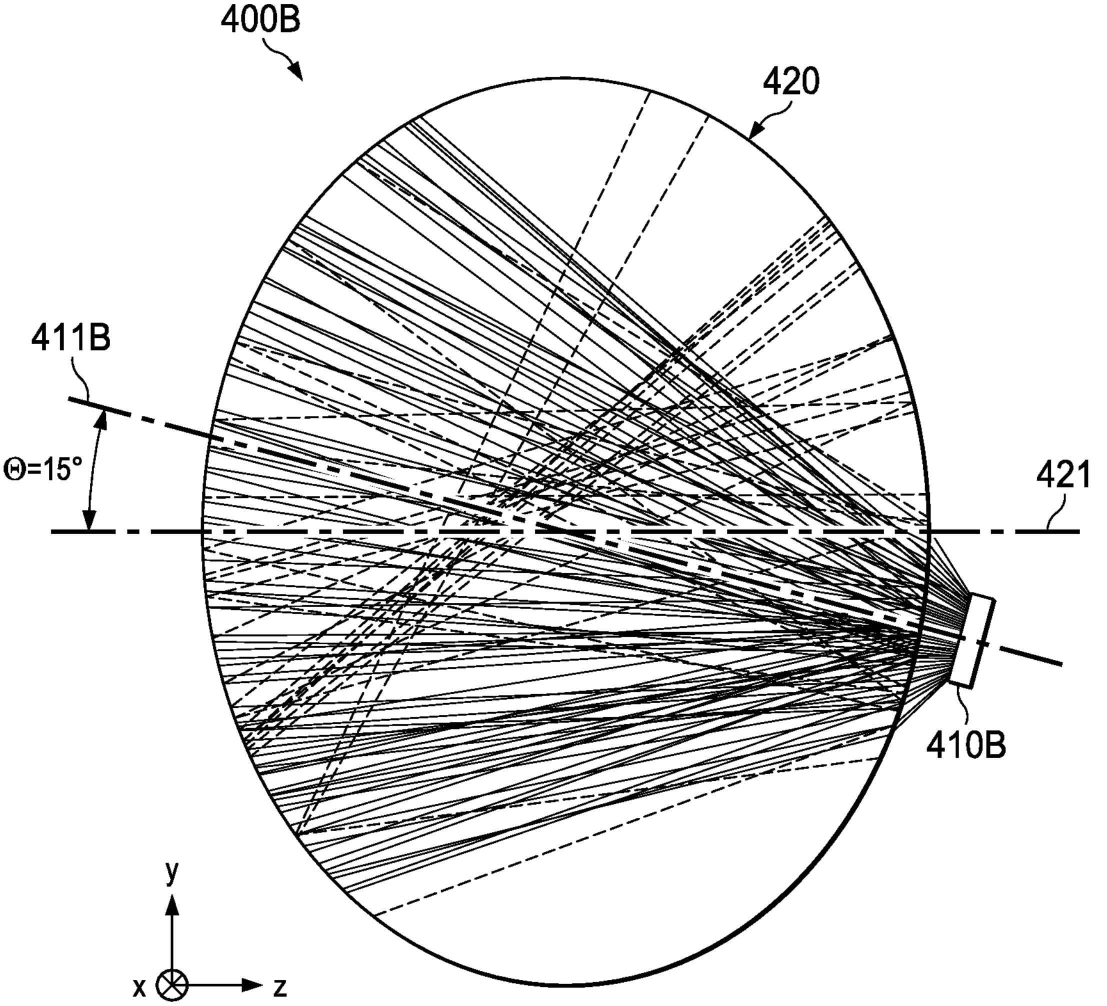
Figure 4C:
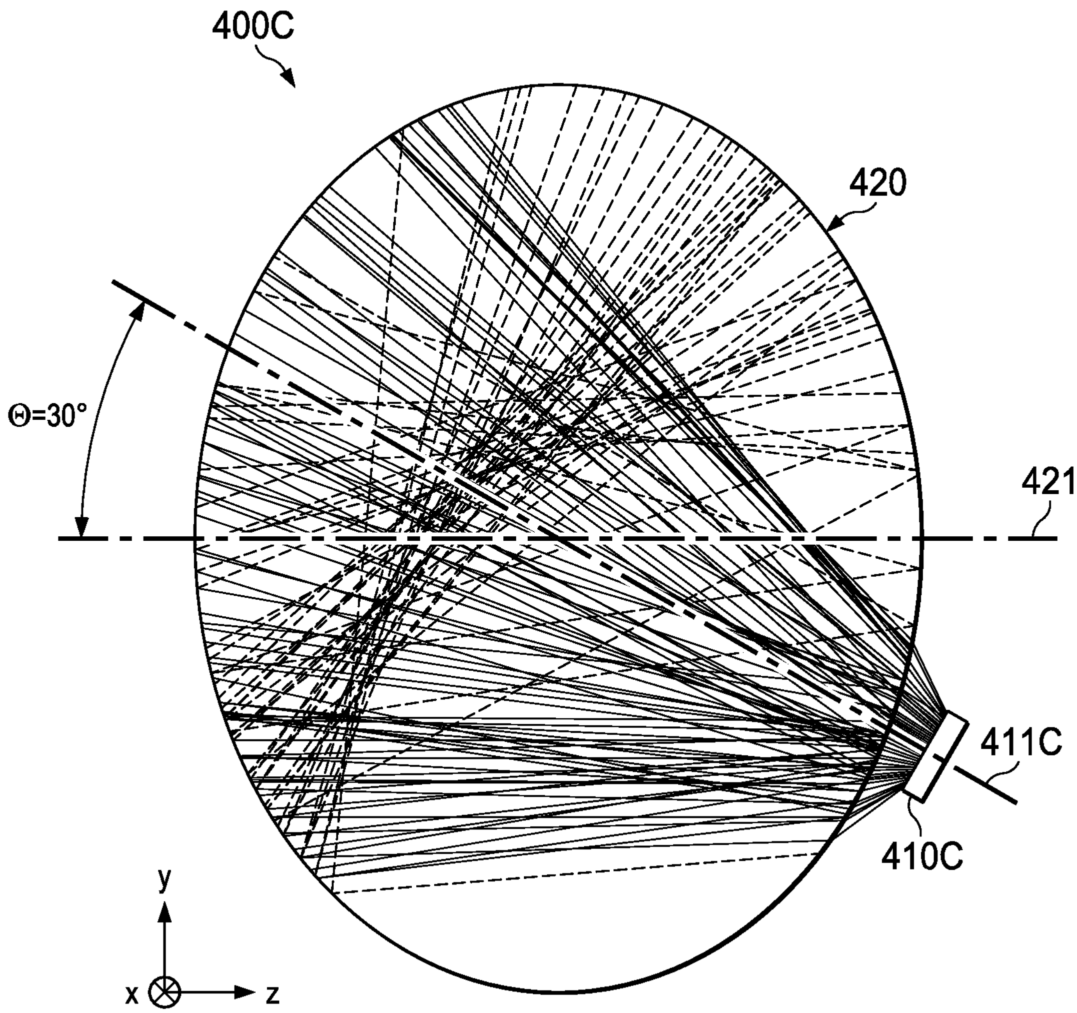
Figure 4D:
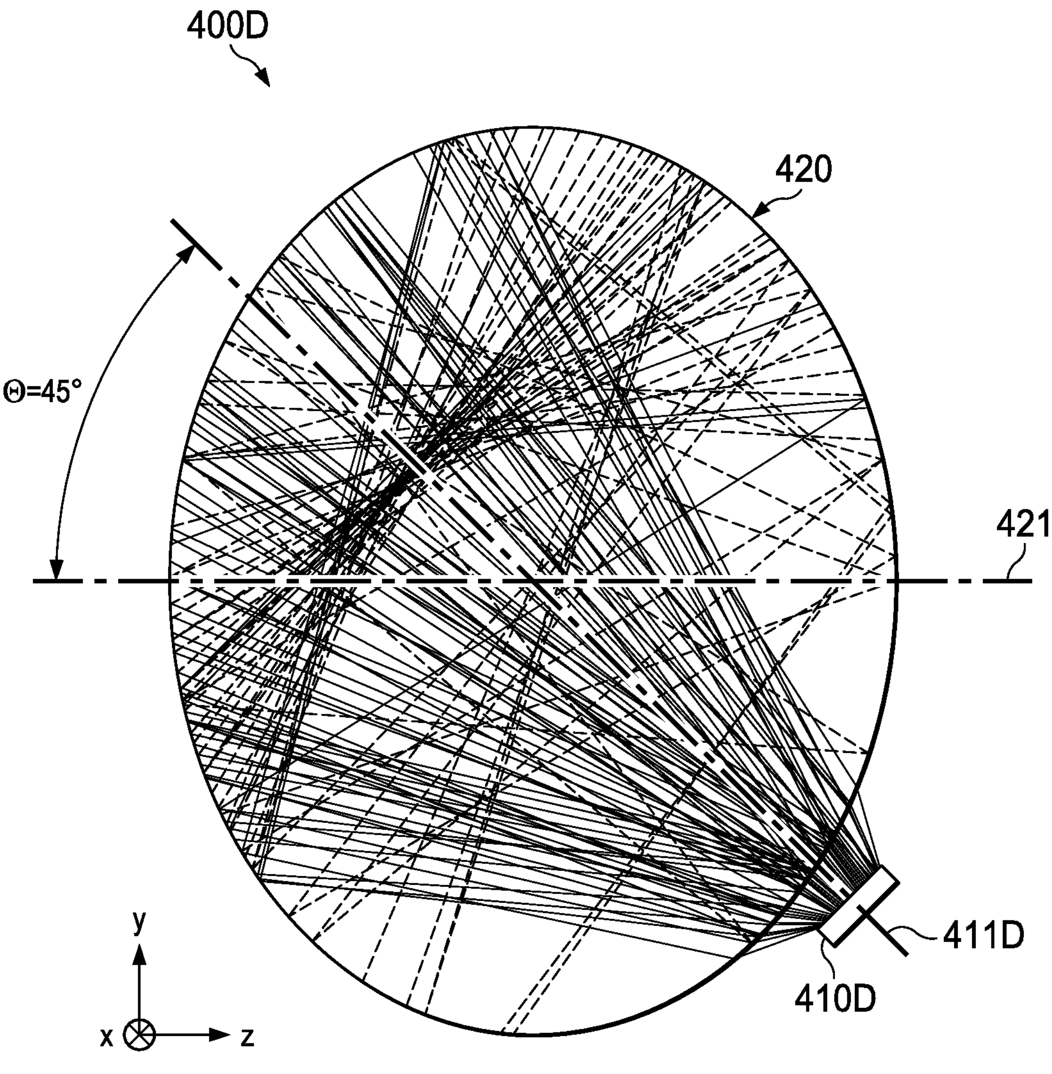
Figure 4E:
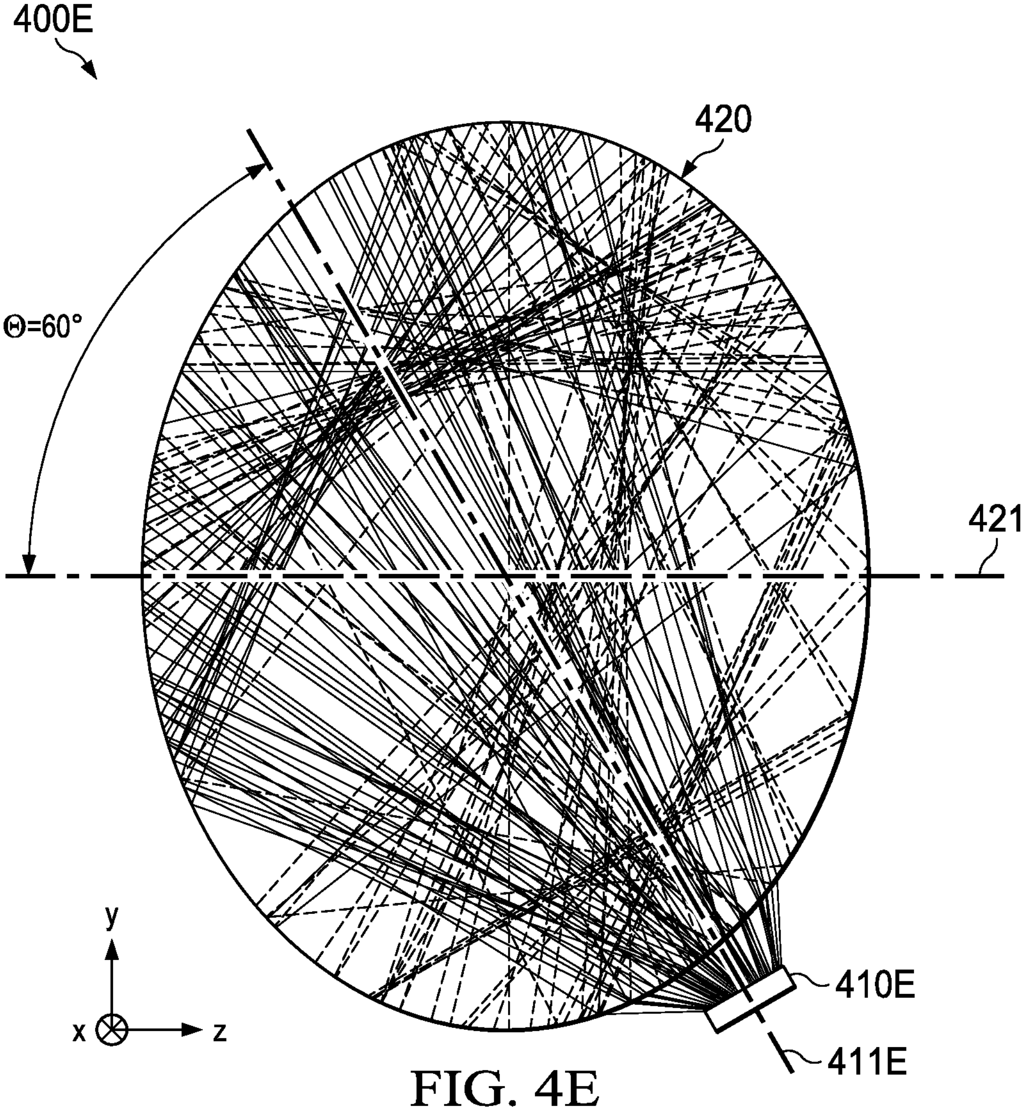
Figure 4F:
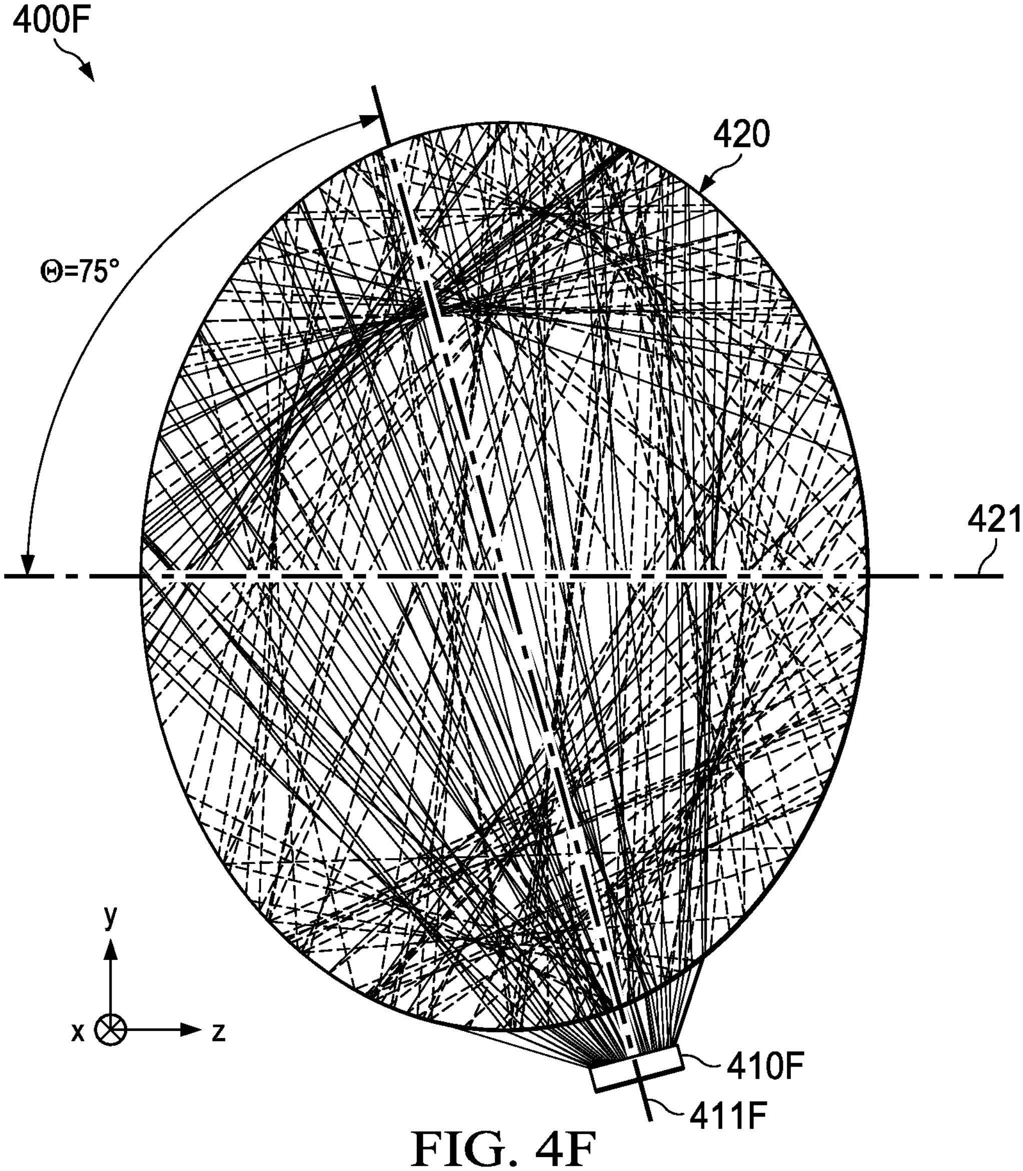
Figure 4G:
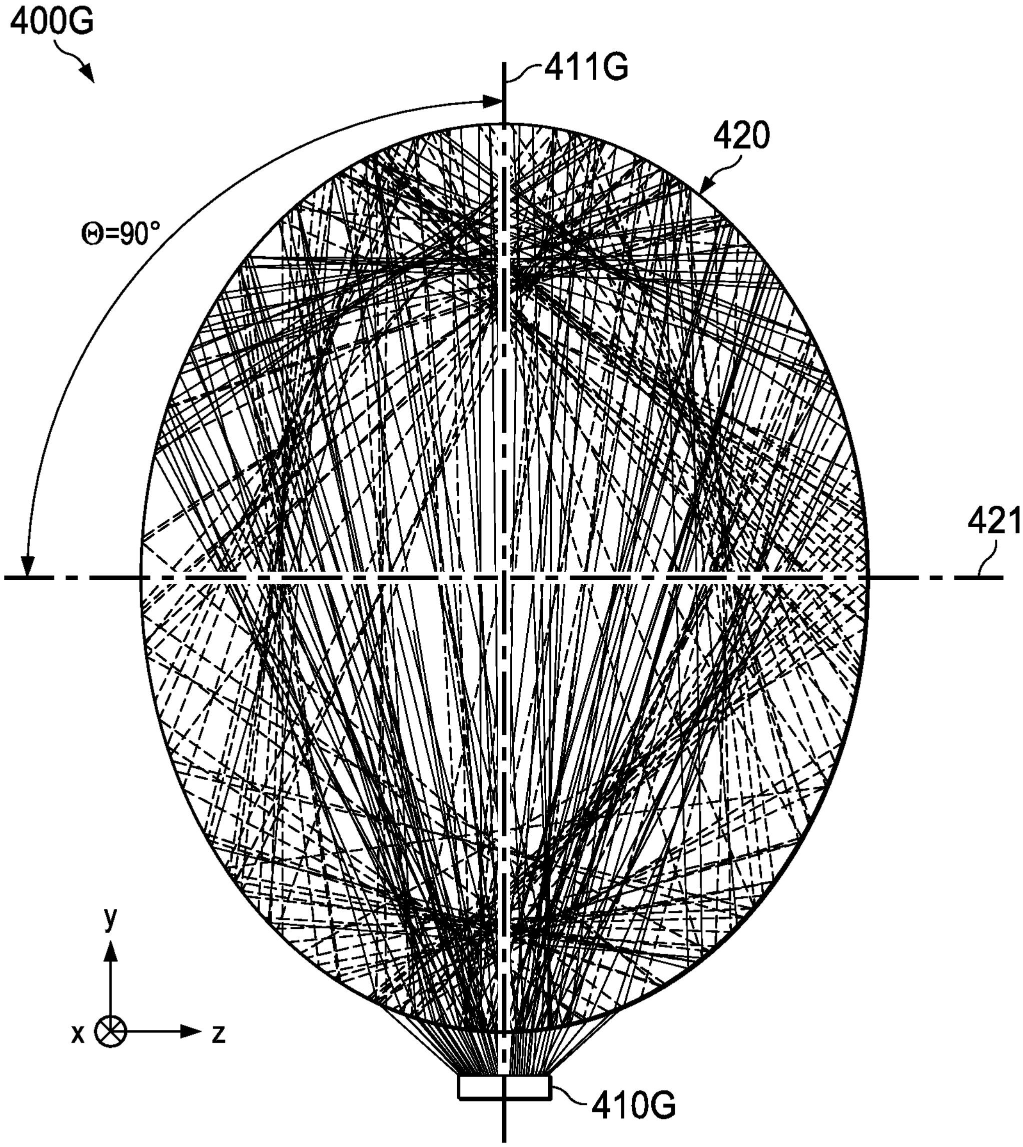
Figure 5A:
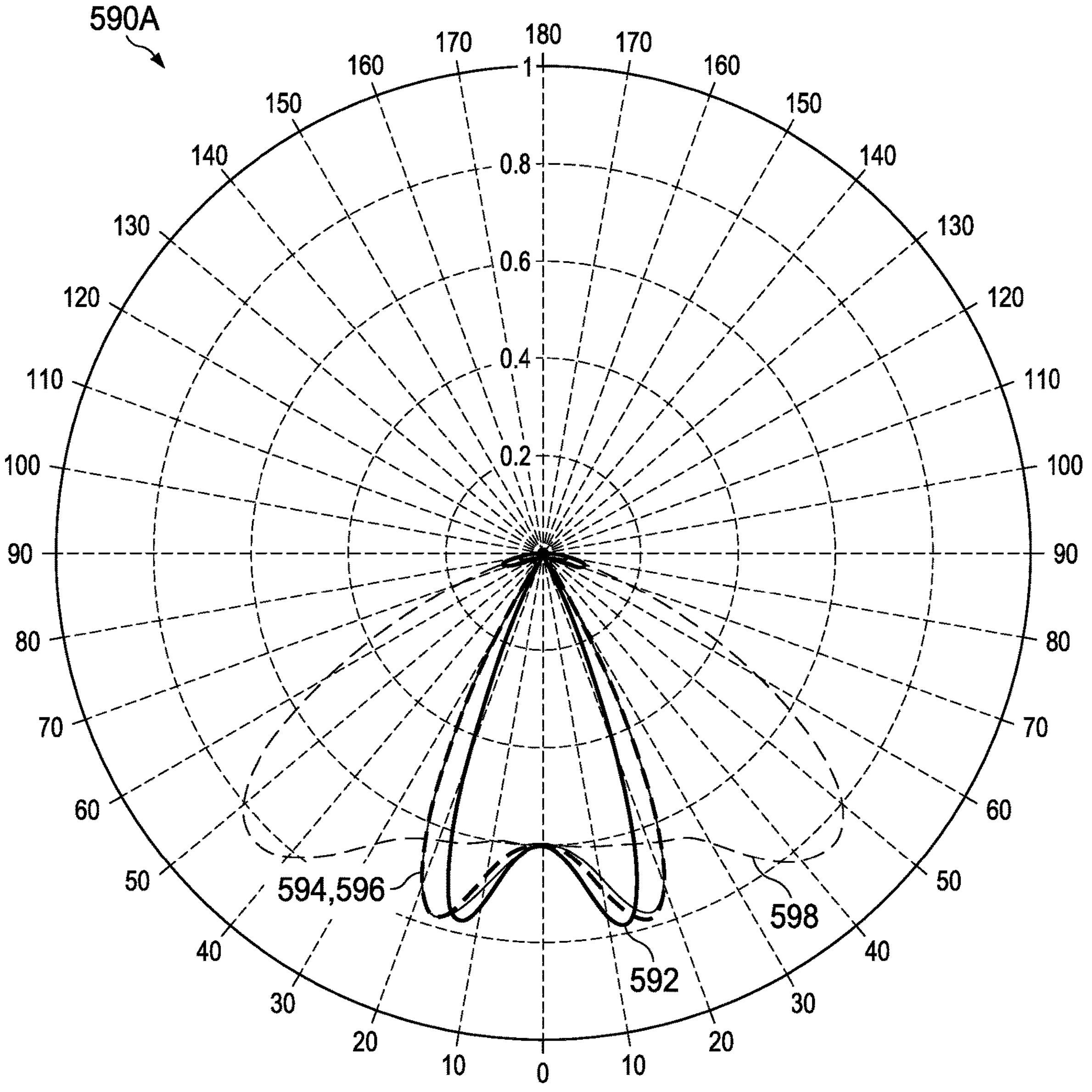

FIG. 5A shows a polar candela distribution plot corresponding to far-field distributions of the light output by the illumination device of FIG. 4A.

Each of FIGS. 5B, 5C, 5D, 5E, 5F and 5G shows a polar candela distribution plot corresponding to far-field distributions of the light output by the illumination device of respective FIGS. 4B, 4C, 4D, 4E, 4F and 4G.

Figure 6A:
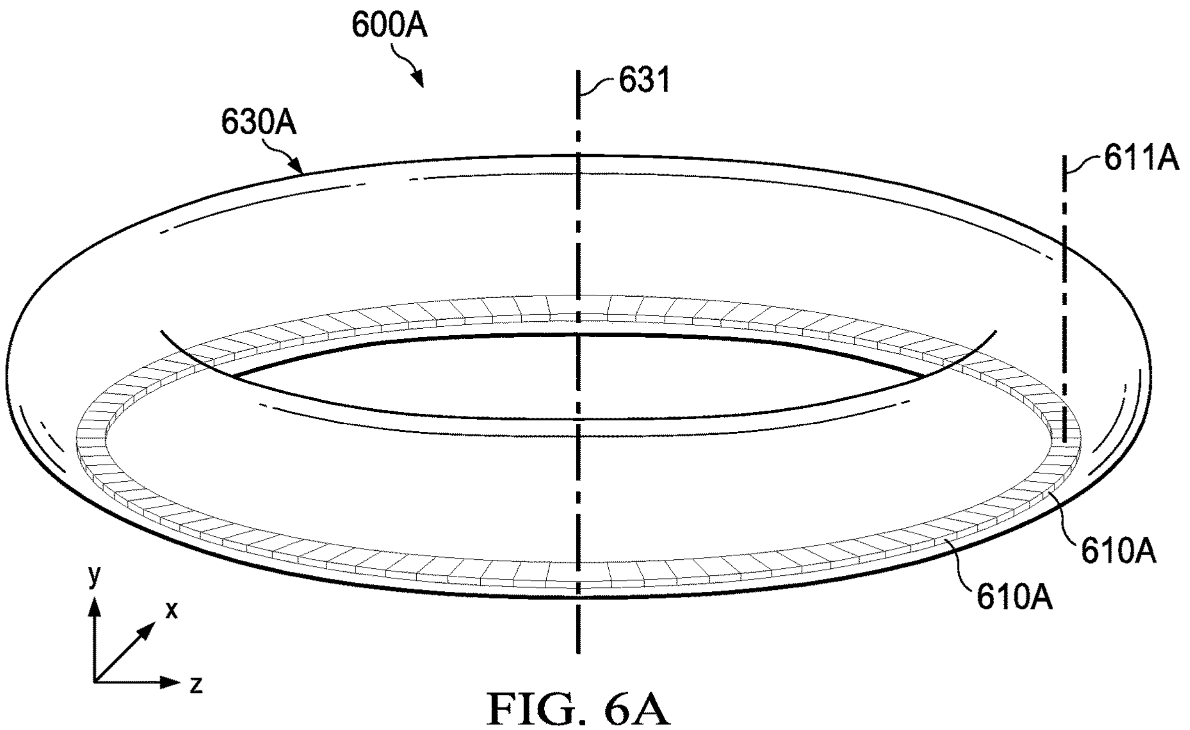

FIG. 6A shows a perspective view of an illumination device which includes a transparent toroidal optical element, and multiple LEEs optically coupled with the optical element and arranged to emit light along directions parallel to the toroidal axis.

Figure 7A:
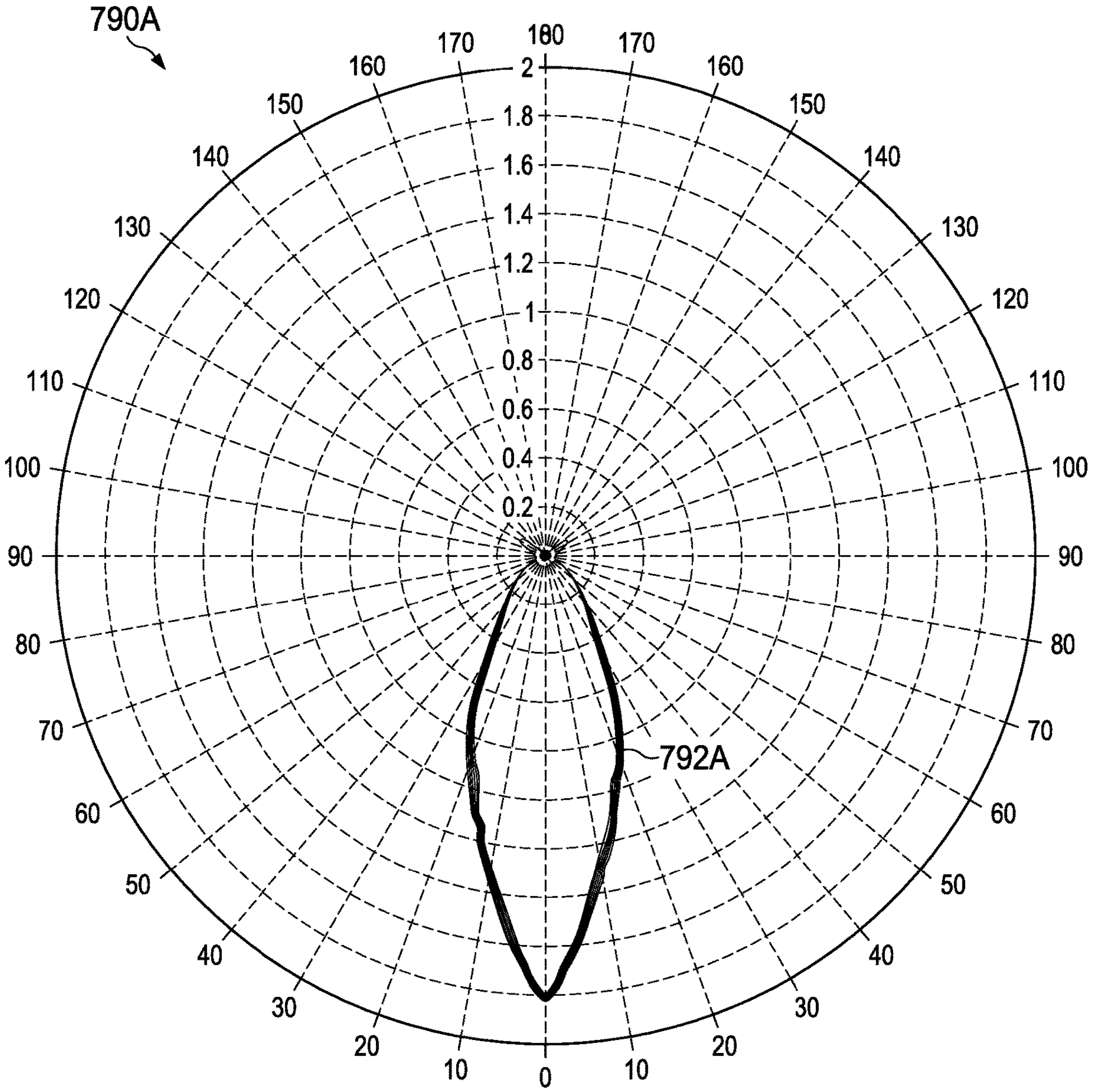

FIG. 7A shows a polar candela distribution plot corresponding to far-field distributions of the light output by the illumination device of FIG. 6A.

Figure 6B:
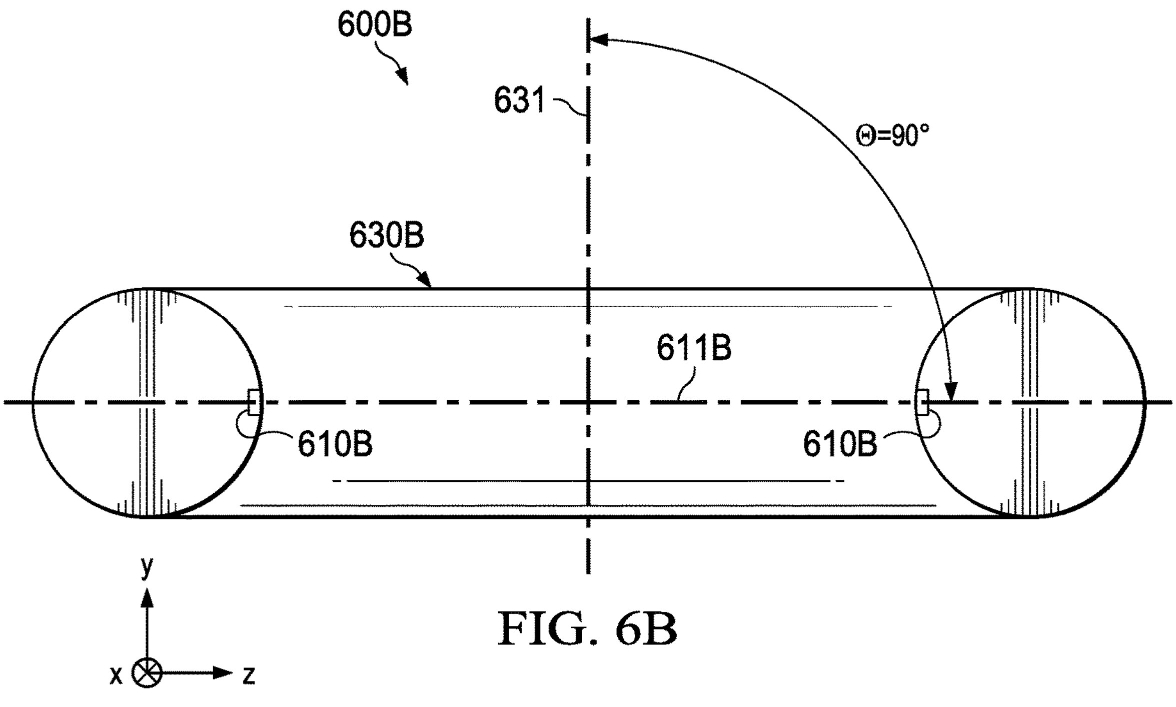

FIG. 6B shows a cross-section, side view of an illumination device which includes a transparent toroidal optical element, and multiple LEEs optically coupled with the optical element and arranged to emit light along directions perpendicular to the toroidal axis.

Figure 7B:
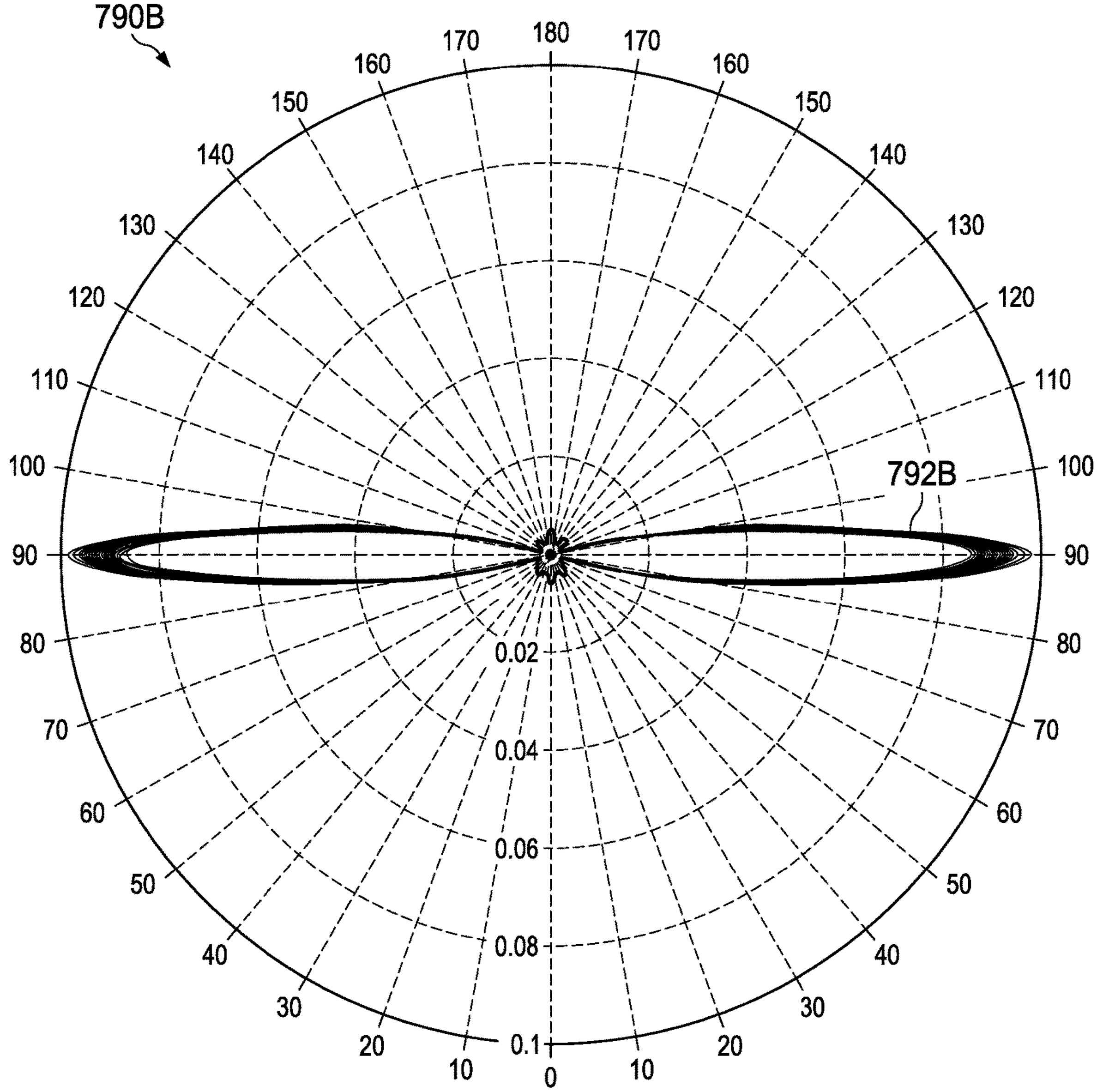

FIG. 7B shows a polar candela distribution plot corresponding to far-field distributions of the light output by the illumination device of FIG. 6B.

Figure 6C:
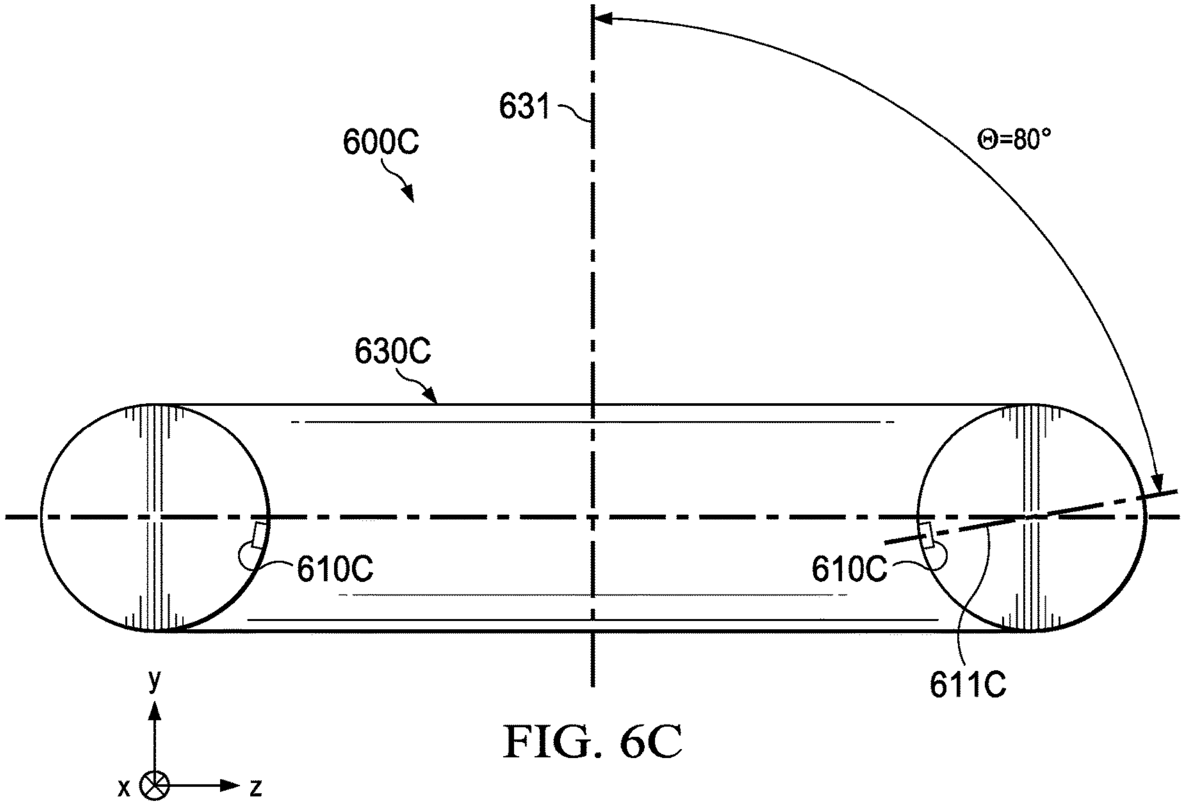

FIG. 6C shows a cross-section, side view of an illumination device which includes a transparent toroidal optical element, and multiple LEEs optically coupled with the optical element and arranged to emit light along directions forming acute angles with the toroidal axis.

Figure 7C:
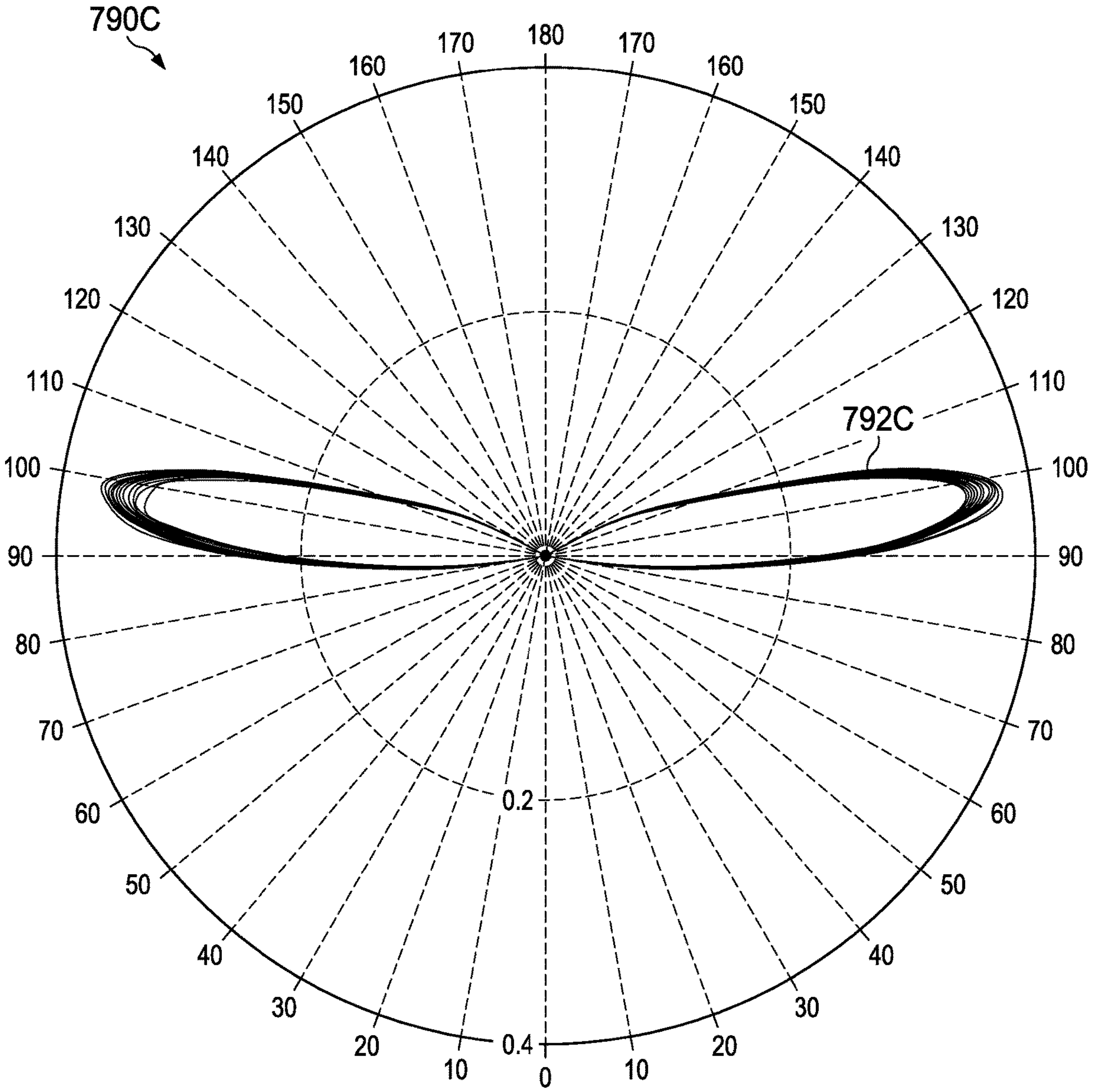
Figure 7C:
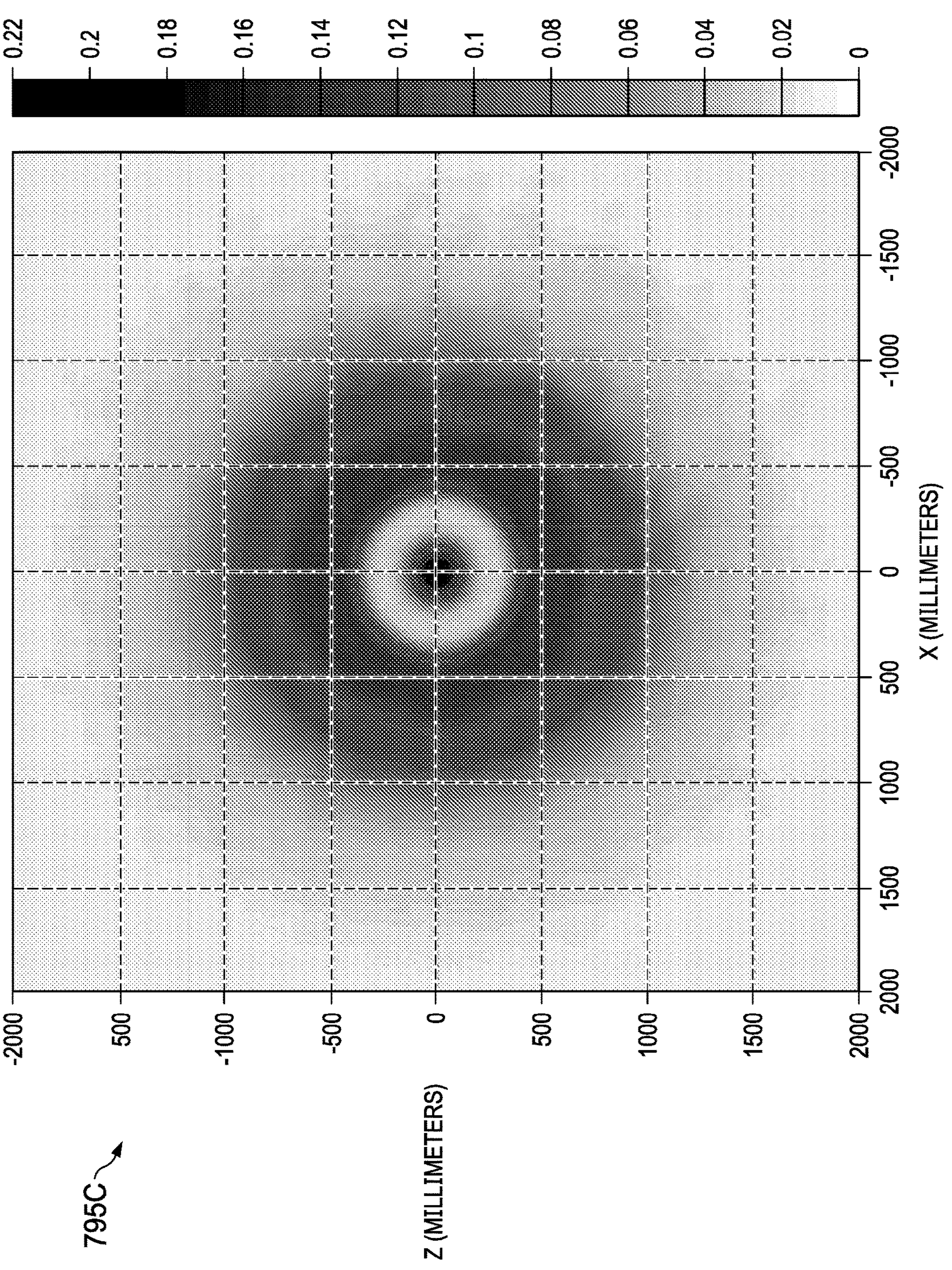

FIG. 7C shows a polar candela distribution plot corresponding to far-field distributions of the light output by the illumination device of FIG. 6C.

FIG. 7CC shows a total irradiance map for incident flux of the light output by the illumination device of FIG. 6C.

Like symbols in different figures indicate like elements.

DETAILED DESCRIPTION OF THE TECHNOLOGY

This disclosure refers to technologies directed to illumination devices with compact configurations that can be adapted, for example, to provide different light emission patterns for different lighting applications, configured to permit changes to the light emission pattern during operation, and/or to form compact illumination devices and optical systems with a high degree of control over the distribution of light. Implementations of the illumination devices can include elongate optics. Optics can be based on suitably shaped cylindrical sections such as rod or tube shaped lenses, for example. The illumination devices including optics can have open or closed straight, polygonal, curvilinear or other extensions. These technologies are described in detail below.

Figure 1A:
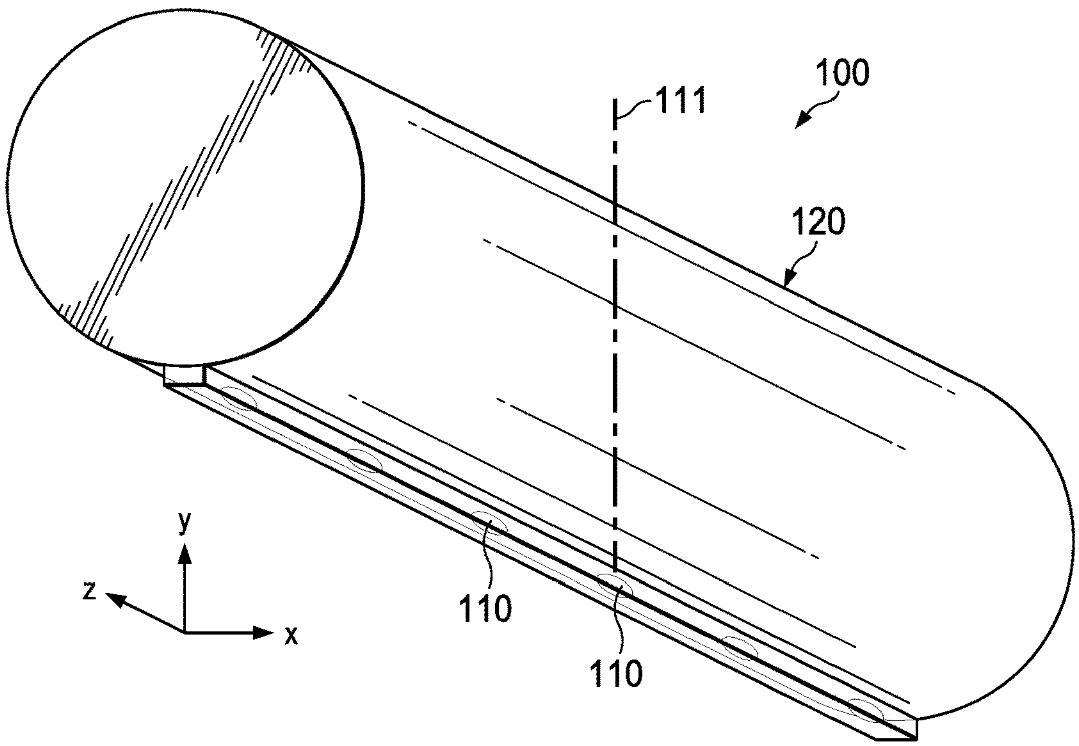
FIGS. 1A-1B show perspective and cross-section views, respectively, of an illumination device which includes a transparent elongate optical element having a circular cross-section perpendicular to an elongation thereof.
Figure 1B:
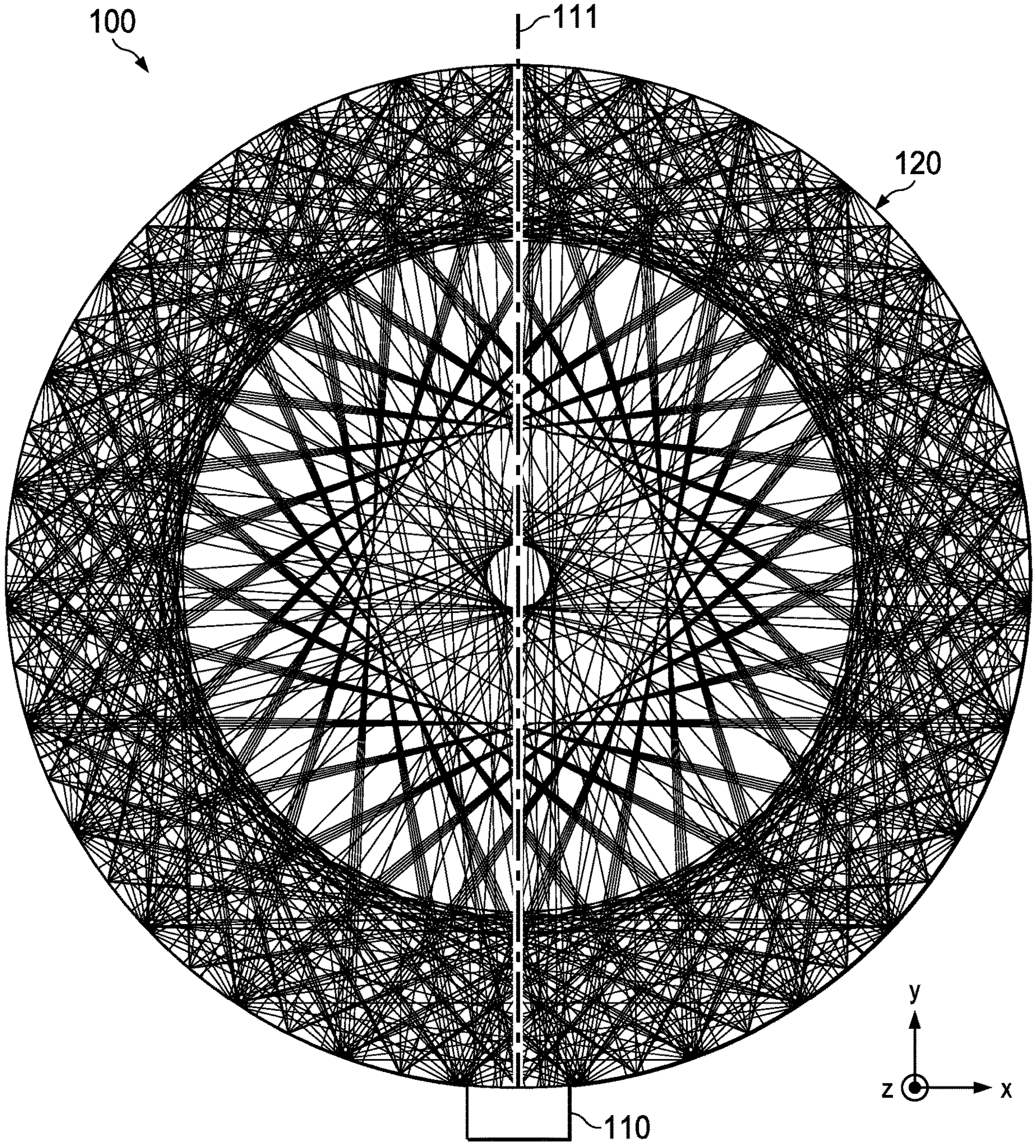

FIG. 1A shows a perspective view, and FIG. 1B shows a cross-section view, of an illumination device 100 which includes a transparent elongate optical element 120 having a circular cross-section perpendicular to an elongation thereof. In the example illustrated in FIGS. 1A-1B, the optical element 120, also referred to as the cylindrical optic, is elongated along the z-axis, and the cross-section is parallel to the (x,y)-plane. The illumination device 100 also includes multiple LEEs 110 optically coupled with the optical element 120, distributed along the elongation of the optical element 120, e.g., in FIG. 1A along the z-axis, and arranged to emit light along an optical axis 111 parallel to a diameter of the circular cross-section. In some implementations, the LEEs 110 are implemented as LEDs, and thus are configured as Lambertian emitters. The optical element 120 is arranged to receive light from the LEEs 110.

In FIGS. 1A-1B, the LEEs 110 are close coupled with the optical element 120. In other implementations, the optical element 120 includes a groove along the elongation thereof, and the LEEs 110 are immersion coupled with the optical element 120. In some implementations, the optical element 120 is made from a plastic material, e.g., acrylic.

Figure 1C:
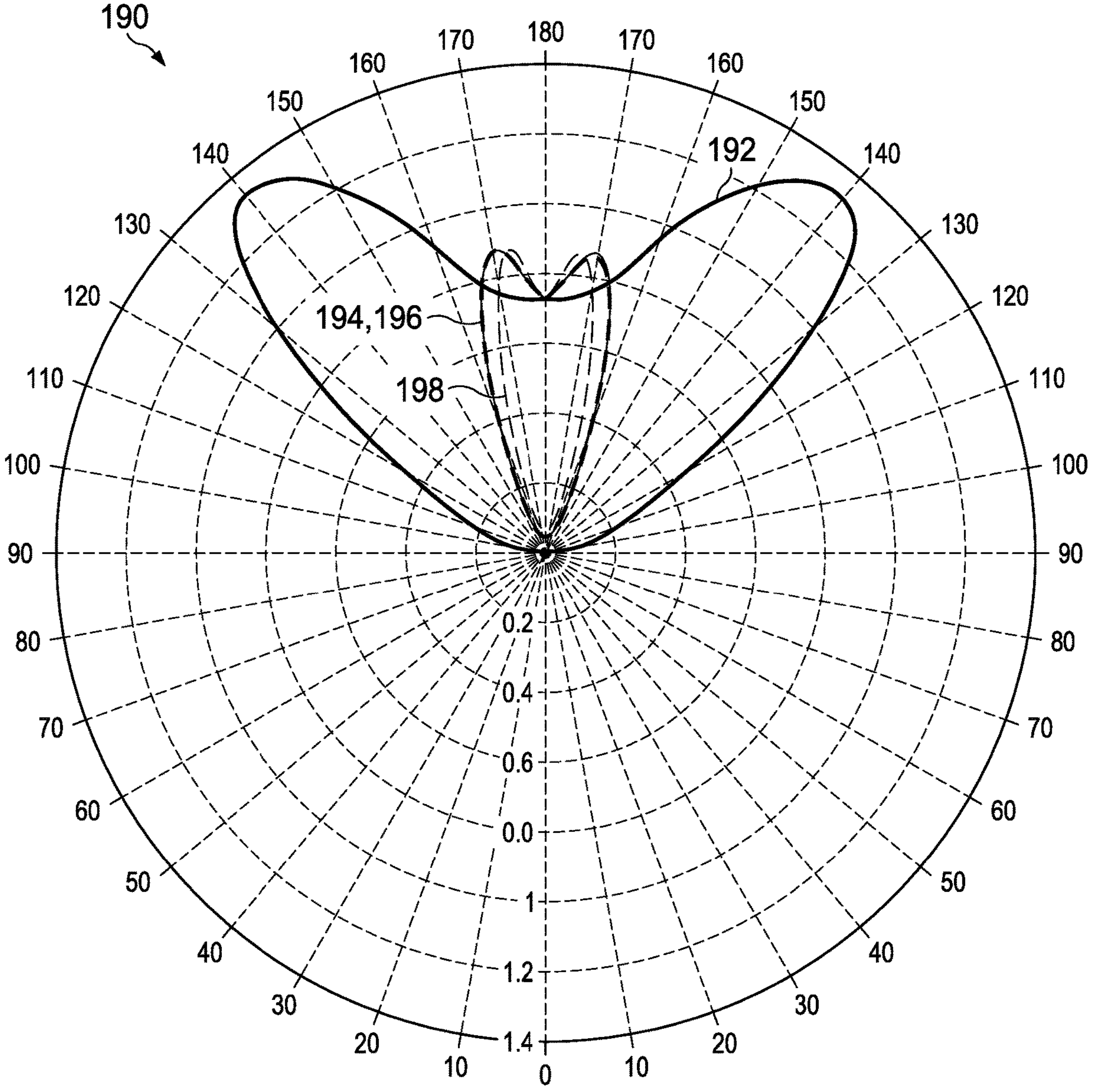
FIG. 1C shows a polar candela distribution plot corresponding to far-field distributions of the light output by the illumination device of FIGS. 1A-1B.

FIG. 1C shows a polar candela distribution plot 190 corresponding to far-field distributions 192, 194, 196, 198 of the light output by the illumination device 100. Here, the far-field distribution 192 corresponds to light emitted parallel to the (y,z)-plane, and the far-field distribution 198 corresponds to light emitted parallel to the (x,y)-plane. The far-field distribution 194 corresponds to light emitted in a plane rotated by 45° about the y-axis relative to the (x,y)-plane, and the far-field distribution 196 corresponds to light emitted in a plane rotated by 135° about the y-axis relative to the (x,y)-plane. Note that the far-field distribution 192 indicates that the illumination device 100 outputs optical power that is extremely focused in the (x,y)-plane of the optical element 120.

Referring again to FIG. 1A, note that for the illumination device 100 having a cylindrical optic 120, resonant reflective angles exist that allow light to circulate inside the optic 120, e.g., as whispering mode galleries. This indicates that hollow optics can be used to selectively tune the emission pattern.

Figure 2A:
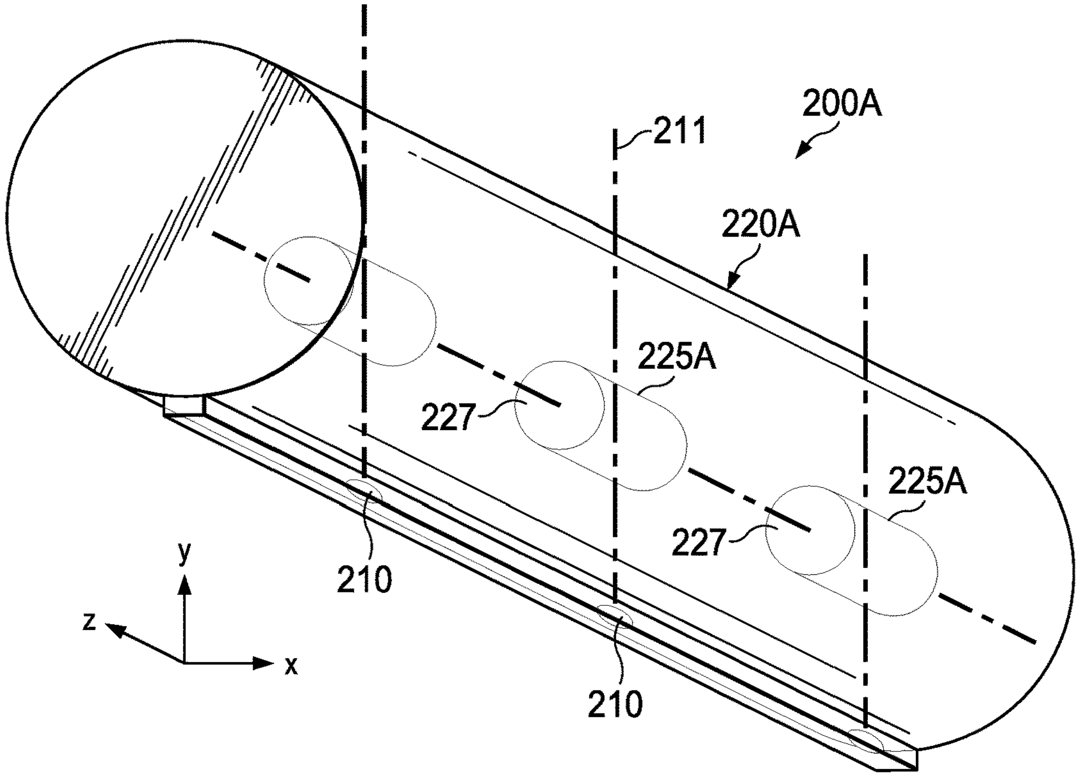
FIGS. 2A-2B show perspective views of respective examples of an illumination device which includes a transparent elongate optical element having one or more cavities arranged along an elongation thereof, where, in a cross-section perpendicular to the elongation, the optical element and the corresponding cavity form concentric circles.

FIG. 2A shows a perspective view of an illumination device 200A which includes a transparent elongate optical element 220A having multiple cavities 225A arranged along an elongation thereof. Each of the cavities 225A includes a medium 227. FIG. 2C shows a view of a cross-section of the illumination device 200A that is perpendicular to its elongation. In the example illustrated in FIG. 2C, the optical element 220A and the corresponding cavity 225A form concentric circles. Here, the optical element 220A is elongated along the z-axis, and the cross-section is parallel to the (x,y)-plane.

Figure 2B:
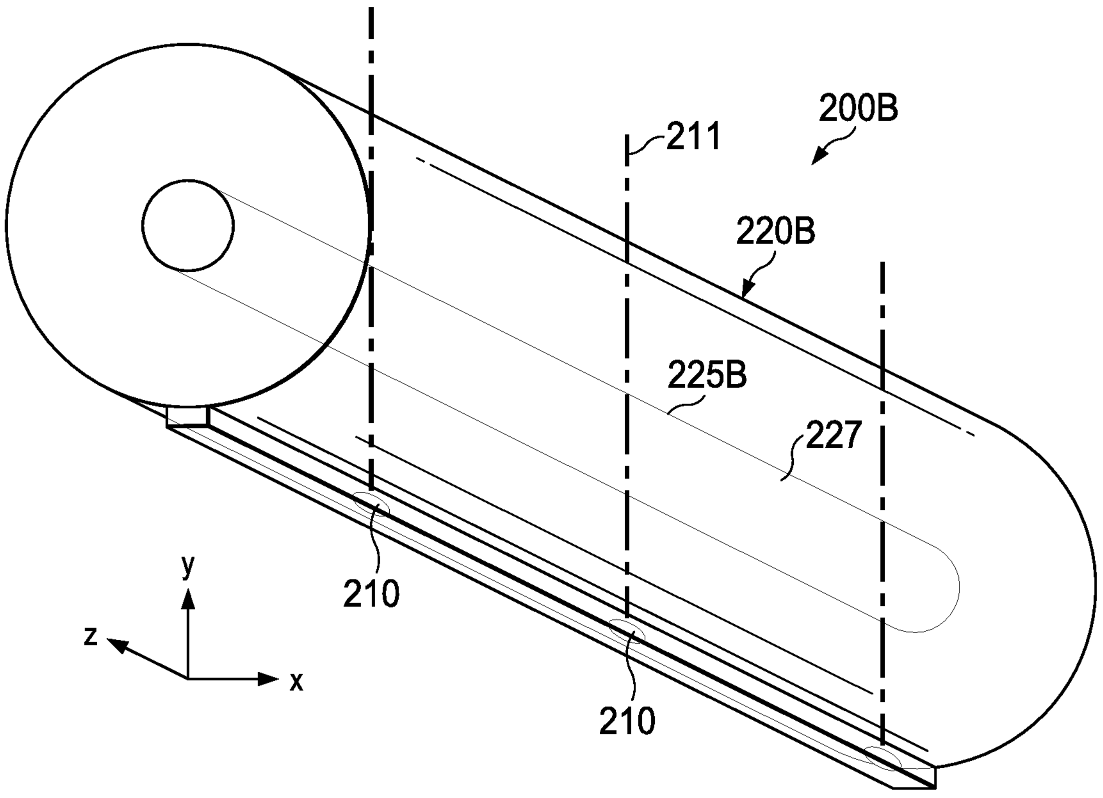
Figure 2C:
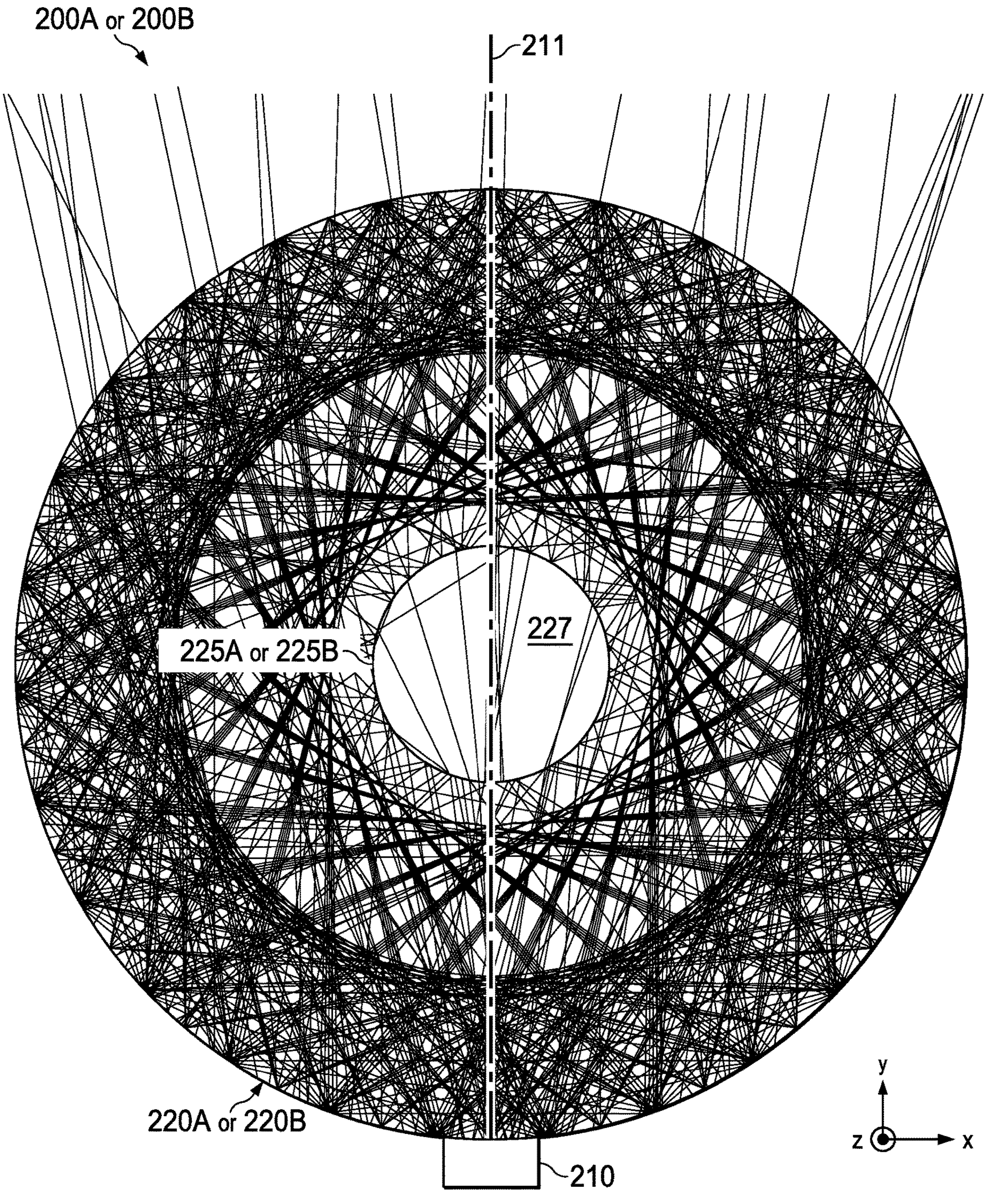
FIG. 2C shows a cross-section view of the illumination devices of FIG. 2A or FIG. 2B.

FIG. 2B shows a perspective view of an illumination device 200B which includes a transparent elongate optical element 220B having a single cavity 225B extending along an elongation thereof. Thus, the optical element 220B is also referred to as a tubular optical element, and the cavity 225B is also referred to as a tubular cavity. The cavity 225B includes a medium 227. FIG. 2C shows a view of a cross-section of the illumination device 200B that is perpendicular to its elongation. In the example illustrated in FIG. 2C, the optical element 220B and the cavity 225B form concentric circles. In the example illustrated in FIGS. 2B and 2C, the optical element 220B is elongated along the z-axis, and the cross-section is parallel to the (x,y)-plane.

In some implementations, each of the optical elements 220A, 220B is made from a plastic material, e.g., acrylic. In the instant implementation, the medium 227 included in the cavities 225A or in the tubular cavity 225B can be air, or a material having a refractive index smaller than a refractive index of the material from which the optical element 220A, 220B is made. In other implementations, the medium can be liquid or solid and have a smaller, like or larger refractive index than the surrounding optical element.

In some implementations, the optical element 220A, 220B extends along a curvilinear path. In some implementations, the optical element 220A, 220B has a closed annular shape.

Each of the illumination devices 200A, 200B also includes multiple LEEs 210 optically coupled with the optical element 220A, 220B, distributed along the elongation of the optical element 220A, 220B, e.g., in FIGS. 2A-2B along the z-axis, and arranged to emit light along an optical axis 211 parallel to a diameter of the tubular cross-section. In some implementations, the LEEs 210 are implemented as LEDs, and thus are configured as Lambertian emitters. In some implementations, the LEEs 210 are operatively arranged on a planar substrate. The optical element 220A, 220B is arranged to receive light from the LEEs 210.

In FIGS. 2A-2C, the LEEs 210 are close coupled with, but nonetheless spaced apart from, the optical element 220A, 220B. In other implementations, the optical element 220A, 220B includes a groove along the elongation thereof, and the LEEs 210 are immersion coupled with the optical element 220A, 220B. In other implementations, the optical element 220A, 220B includes indentations distributed along the elongation thereof, and the LEEs 210 are immersion coupled with the optical element 220A, 220B through corresponding indentations.

Figure 2D:
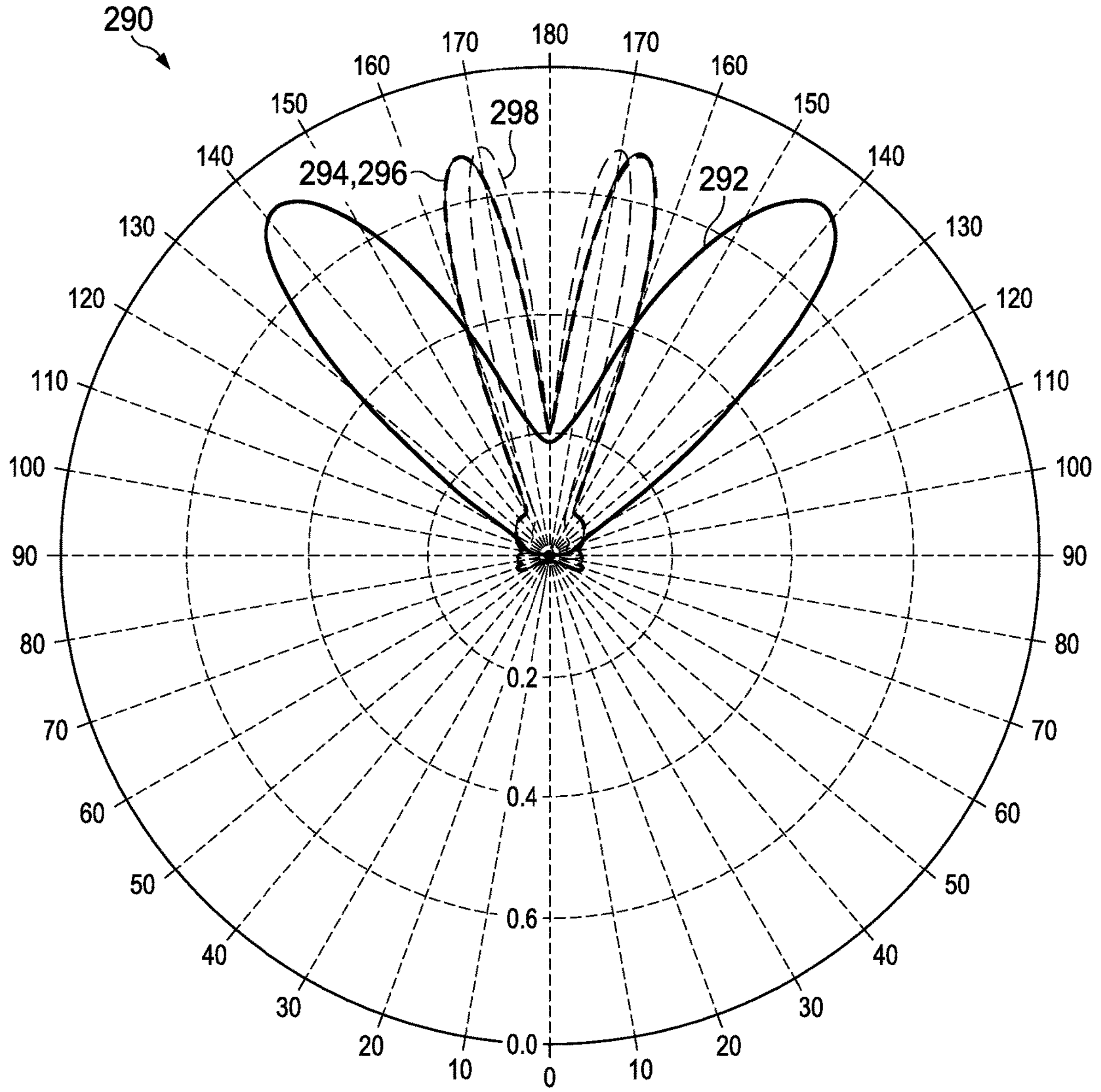
FIG. 2D shows a polar candela distribution plot corresponding to far-field distributions of the light output by the illumination device of FIGS. 2A-2C.
Figure 2E:
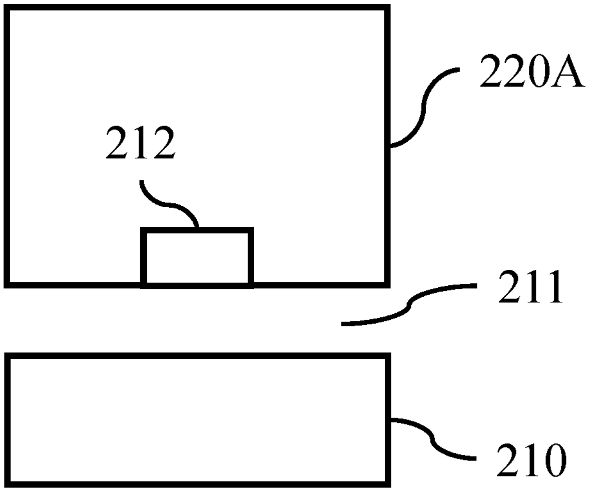
FIG. 2E is a schematic diagram of a portion of an illumination device.

Referring to FIG. 2E, in some implementations, the illumination device 200A, 200B includes one or more phosphor elements 212 arranged to receive light from the LEEs 210 and configured to convert at least a portion of the received light into light having a second spectral power distribution different from a first spectral power distribution of the received light. Here, the optical element 220A, 220B can include one or more indentations and the phosphor elements 212 are arranged in the one or more indentations. In some cases, the indentations merge onto each other and form a single groove extending along the extension of the optical element 220A, 220B. Here, the phosphor elements also merge into each other and form a single contiguous phosphor element arranged within the groove. Note that, the phosphor element and the LEEs 210 can be separated by a gap 211.

FIG. 2D shows a polar candela distribution plot 290 corresponding to far-field distributions 292, 294, 296, 298 of the light output by the illumination device 200A, 200B. Here, the far-field distribution 292 corresponds to light emitted parallel to the (y,z)-plane, and the far-field distribution 298 corresponds to light emitted parallel to the (x,y)-plane. The far-field distribution 294 corresponds to light emitted in a plane rotated by 45° about the y-axis relative to the (x,y)-plane, and the far-field distribution 296 corresponds to light emitted in a plane rotated by 135° about the y-axis relative to the (x,y)-plane. The prominent dip along the y-axis for each of the far-field distributions 292, 294, 296, 298 suggests that cavities 225A, 225B cause a strong reduction of the emission intensity along the optical axis of the illumination device 200A, 200B.

Note that the elongate optical elements 220A, 220B of respective illumination devices 200A, 200B can be modified such that, in a cross-section perpendicular to the elongation thereof, the circles formed by the optical elements 220A, 220B and the corresponding cavity 225A, 225B are not concentric, but eccentric. Such devices are described below.

Figure 3A:
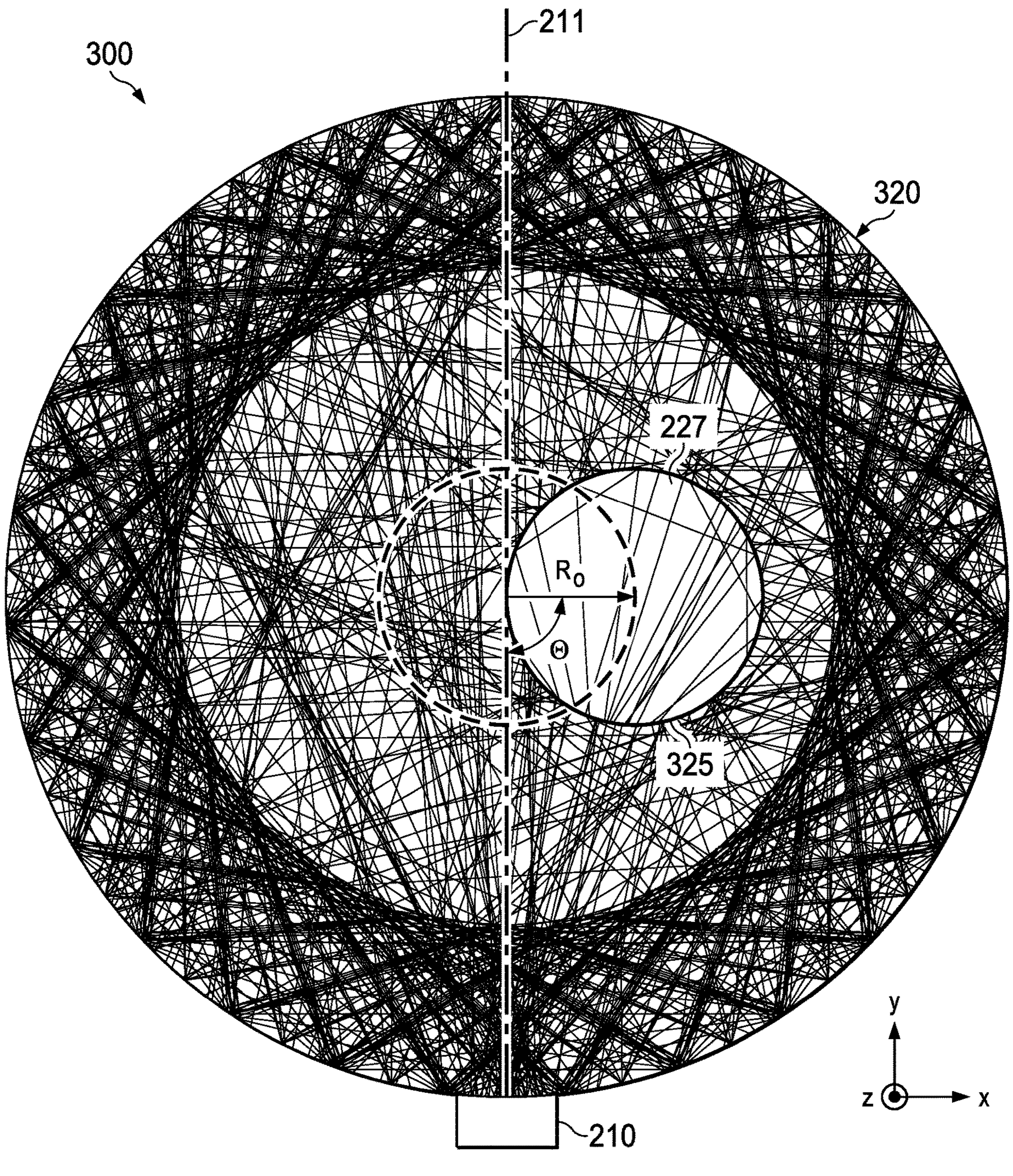
FIG. 3A shows a cross-section view of an illumination device which includes an example of a transparent elongate optical element having one or more cavities arranged along an elongation thereof, where, in a cross-section perpendicular to the elongation, the optical element and the corresponding cavity form eccentric circles.

FIG. 3A shows a cross-section view of an illumination device 300 which includes a transparent elongate optical element 320 having one or more cavities 325 arranged along an elongation thereof, where, in a cross-section perpendicular to the elongation, the optical element 320 and the corresponding cavity 325 form eccentric circles. The illumination device 300 includes multiple LEEs 210 optically coupled with and distributed along the elongation of the optical element 320 in the manner described above in connection with FIGS. 2A-2C.

In general, a center of a section of the corresponding cavity 325 is offset from a center of a section of the optical element 320 by a radial offset $R_O \neq 0$ and an azimuthal angle Θ relative to an optical axis 211 of the LEEs 210. In this manner, the section of the cavity 325 can be axially offset from a section of the optical element 320 toward the LEEs 210, when $R_O \neq 0$ and Θ=0°, or away from the LEEs 210, when $R_O \neq 0$ and Θ=180°. Alternatively, the section of the cavity 325 can be offset from a section of the optical element 320 in a direction forming an azimuthal angle Θ other than zero or 180° relative to the optical axis 211. For instance, in the example illustrated in FIG. 3A, the section of the cavity 325 is offset to the right of the optical axis 211 by an azimuthal angle Θ≈+90°.

Figure 3B:
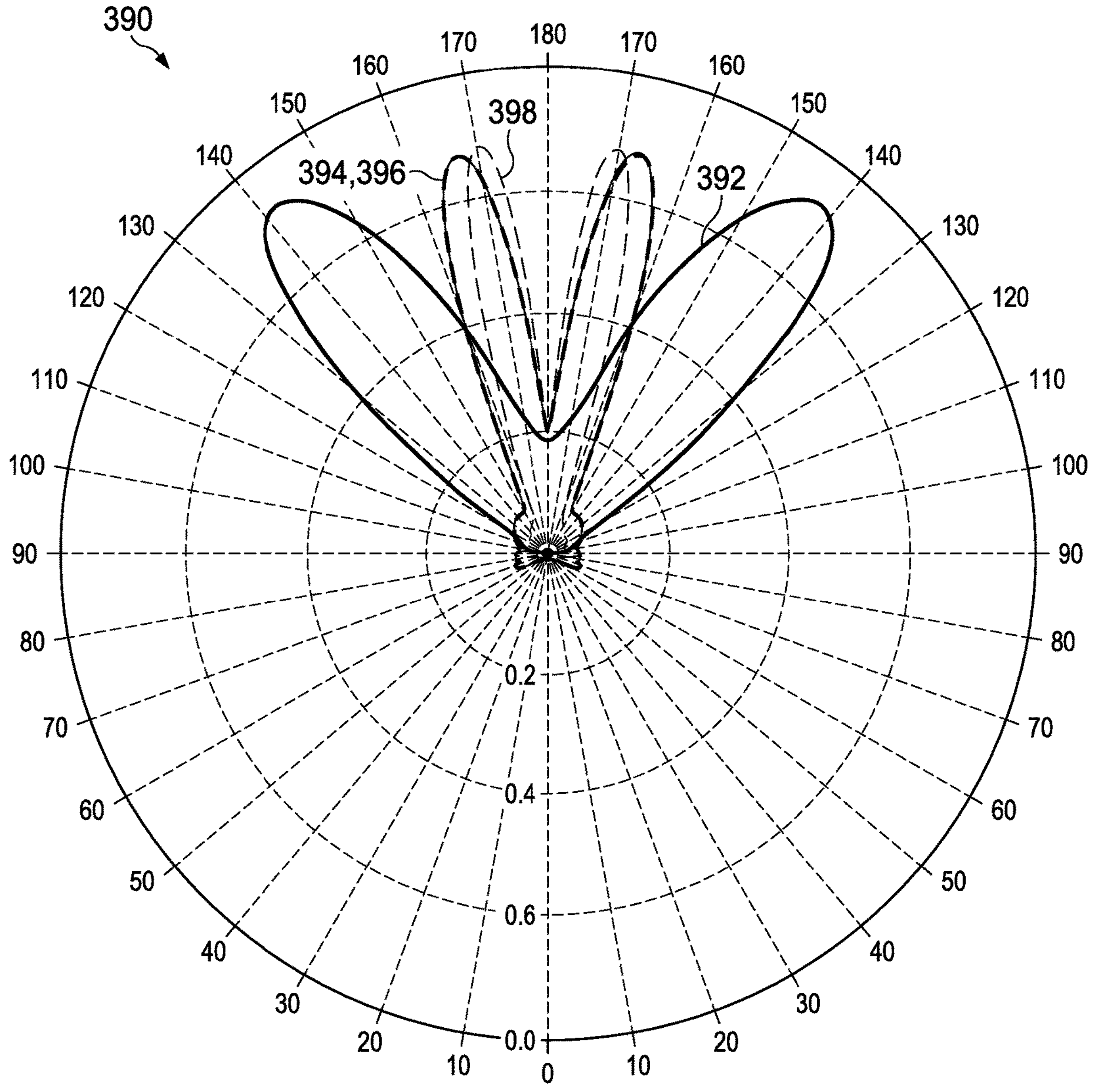
FIG. 3B shows a polar candela distribution plot corresponding to far-field distributions of the light output by the illumination device of FIG. 3A.

FIG. 3B shows a polar candela distribution plot 390 corresponding to far-field distributions 392, 394, 396, 398 of the light output by the illumination device 300. Here, the far-field distribution 392 corresponds to light emitted parallel to the (y,z)-plane, and the far-field distribution 398 corresponds to light emitted parallel to the (x,y)-plane. The far-field distribution 394 corresponds to light emitted in a plane rotated by 45° about the y-axis relative to the (x,y)-plane, and the far-field distribution 396 corresponds to light emitted in a plane rotated by 135° about the y-axis relative to the (x,y)-plane. The relative shapes of the far-field distributions 392, 394, 396, 398 suggest that the offset cavity 325 can be used for shifting the direction of the emission of the illumination device 300 relative to the optical axis, here relative to the y-axis. This suggests that significant beam shaping can be accomplished by rotating the optical element 320 with an offset cavity 325 about its long axis, here the z-axis. This provides a simple external geometry (circular rotation about the optical element 320' axis) for operating the illumination device 300 to permit adjusting the distribution of light emitted from a corresponding illumination device.

Elliptical optics, for instance to replace the cylindrical optic 120, offer another degree of freedom for tuning emission patterns of illumination devices. The far-field distribution of output light is symmetric when the optical axis of LEEs is aligned with the major or minor axis of the ellipse.

Rotating such an elliptical optic over the LEEs shifts the emission pattern in a predictable manner, as described below.

Each of FIGS. 4A, . . . , 4G shows a cross-section view of a respective illumination device 400A, . . . , 400G which includes a transparent elongate optical element 420 having an elliptical cross-section perpendicular to an elongation thereof, where the elliptical cross-section has a first axis 421 parallel to the z-axis. The optical element 420 can be referred to as the elliptical optic. In addition, each of the illumination devices 400A, . . . , 400G includes one or more LEEs 410A, . . . , 410G optically coupled with the optical element 420. In FIGS. 4A-4G, the LEEs 410A, . . . , 410G are close coupled with, but nonetheless spaced apart from, the optical element 420. In this manner, the LEEs 410A, . . . , 410G can be arranged (e.g., at the point of purchase, in the field, etc.) to emit light at various angles relative to the first axis 421 of the elliptical cross-section of the optical element 420, in the following manner. For instance, the elliptical optic 420 can have the following dimensions: 8 mm along the first axis 421 (e.g., minor axis of the elliptical cross-section disposed here along the z-axis), 10 mm along a second axis (e.g., major axis of the elliptical cross-section disposed here along the y-axis), and 100 mm along the optical element 420's elongation, e.g., along the x-axis.

In the example illustrated in FIG. 4A, the one or more LEEs 410A are arranged to emit light along an emission axis 411A parallel to the first axis 421 of the elliptical cross-section of the optical element 420. In each of the examples illustrated in respective FIGS. 4B, 4C, 4D, 4E, and 4F, the one or more LEEs 410B, . . . , 410F are arranged to emit light along an emission axis 411B, . . . , 411F forming a respective acute angle Θ=15°, 30°, 45°, 60°, 75° to the first axis 421 of the elliptical cross-section of the optical element 420. In the example illustrated in FIG. 4G, the one or more LEEs 410G are arranged to emit light along an emission axis 411G perpendicular to the first axis 421 of the elliptical cross-section of the optical element 420.

Depending on the implementation, the optical element 420 can be made from plastic or glass materials, e.g., acrylic, polycarbonate or various forms of inorganic glasses.

Figure 5B:
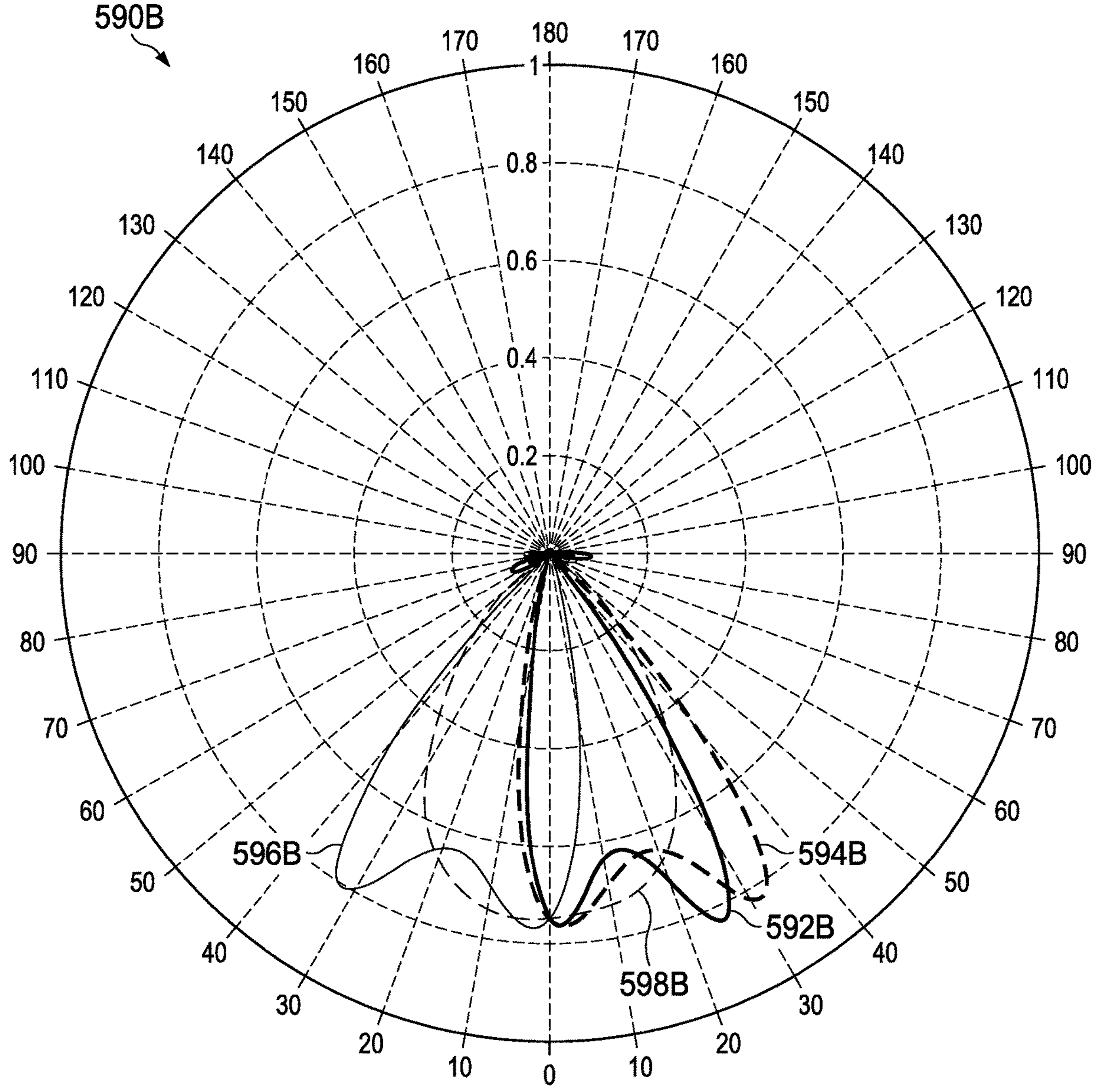
Figure 5C:
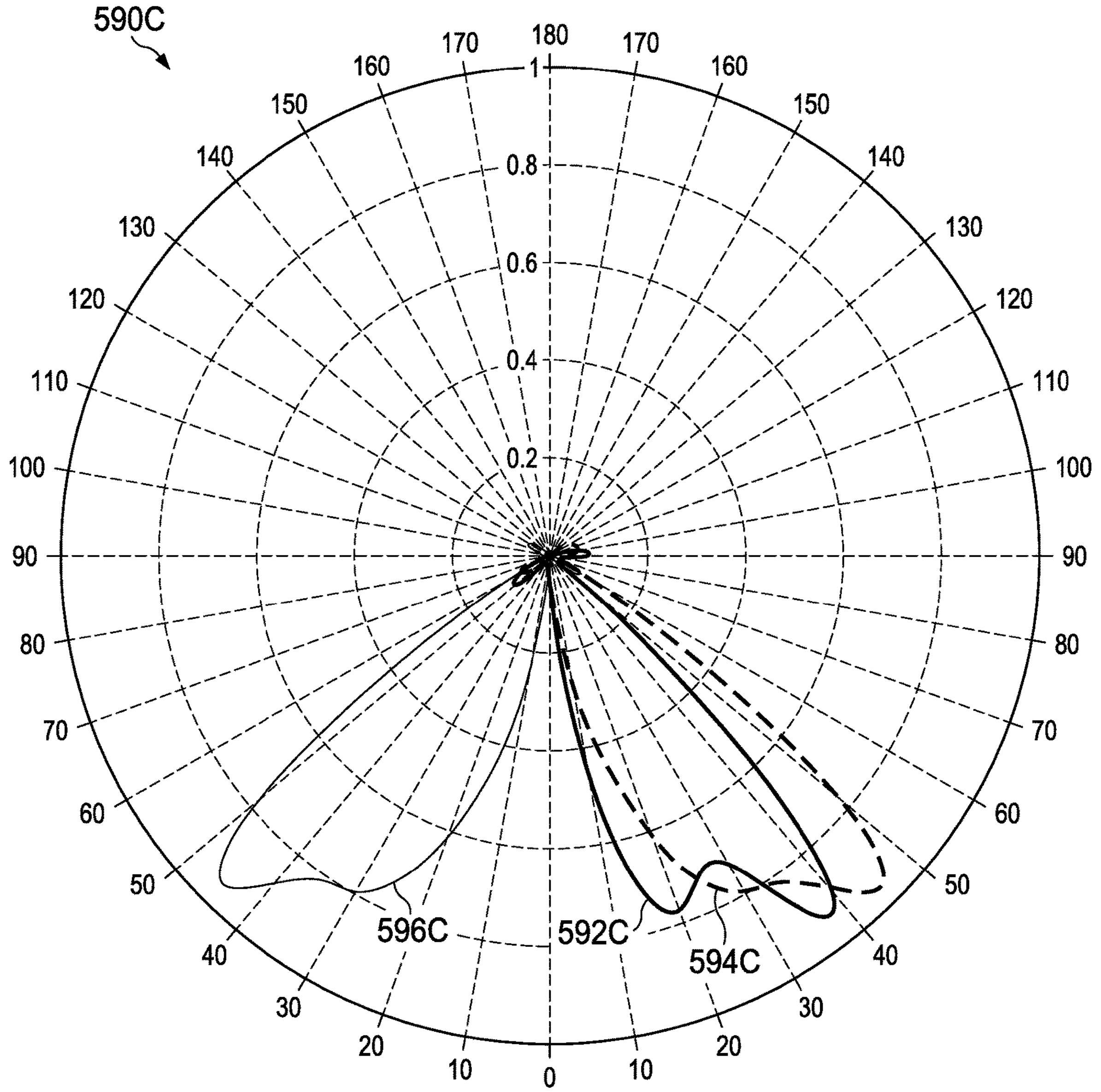
Figure 5D:
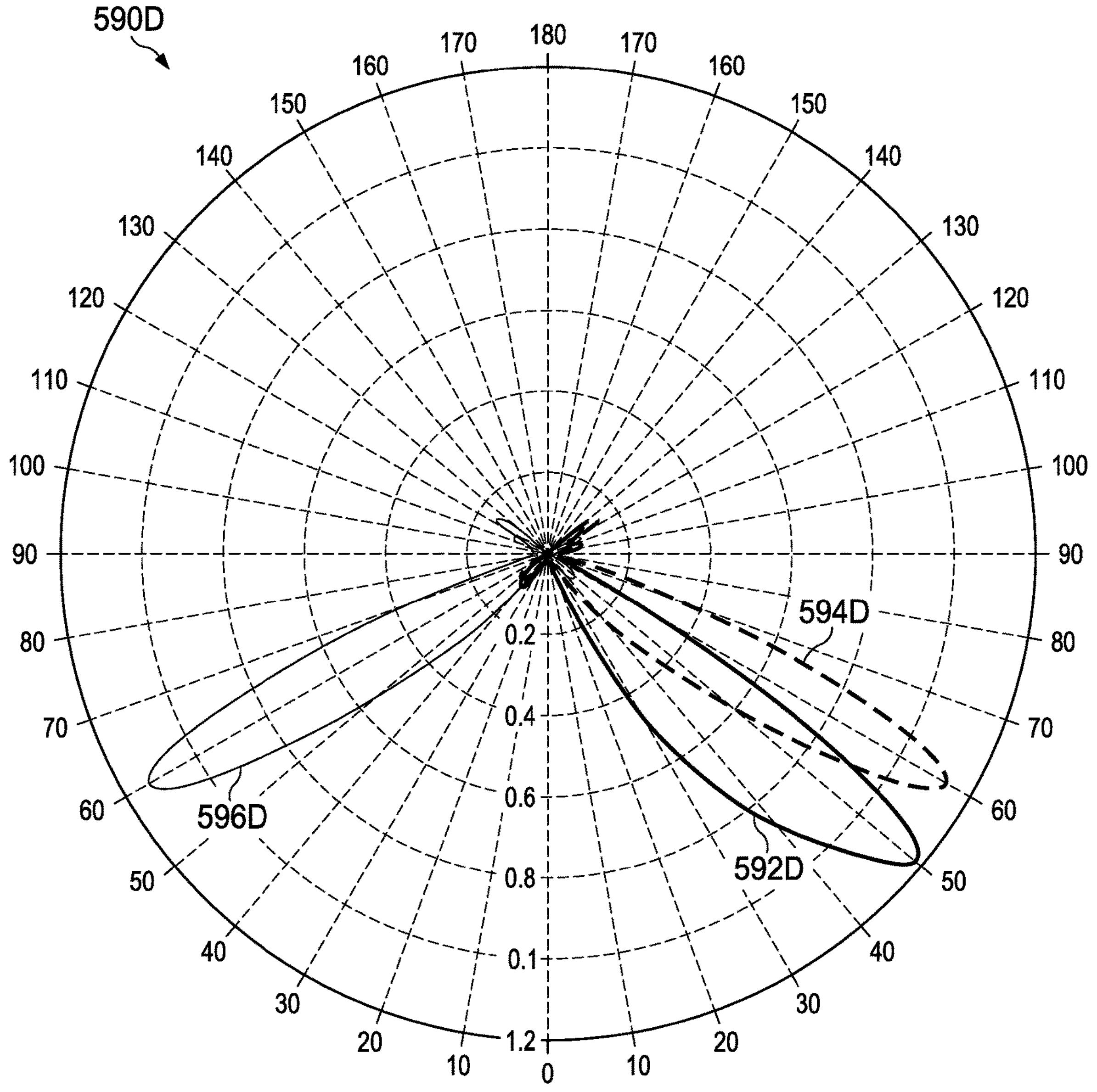
Figure 5E:
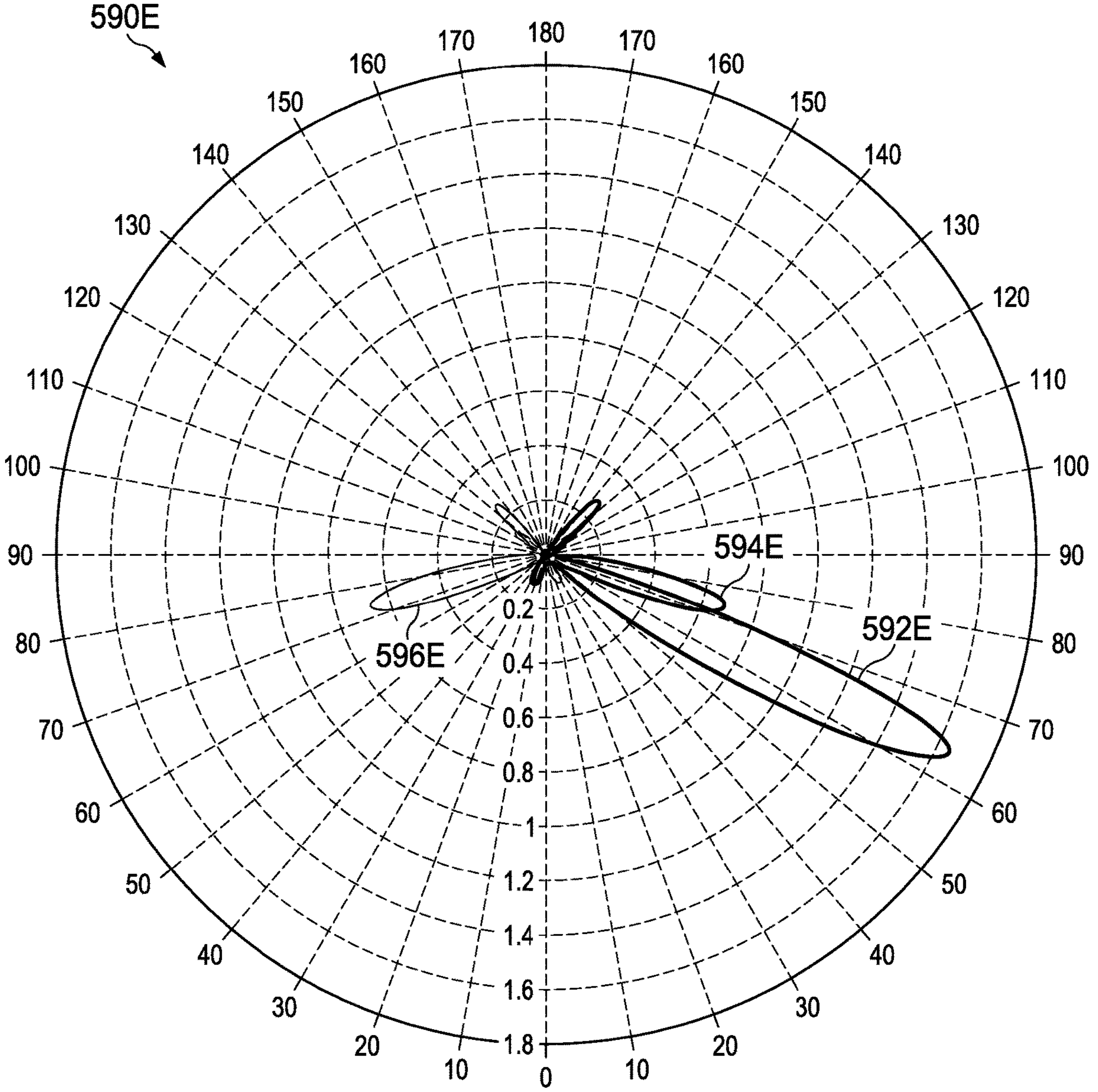
Figure 5F:
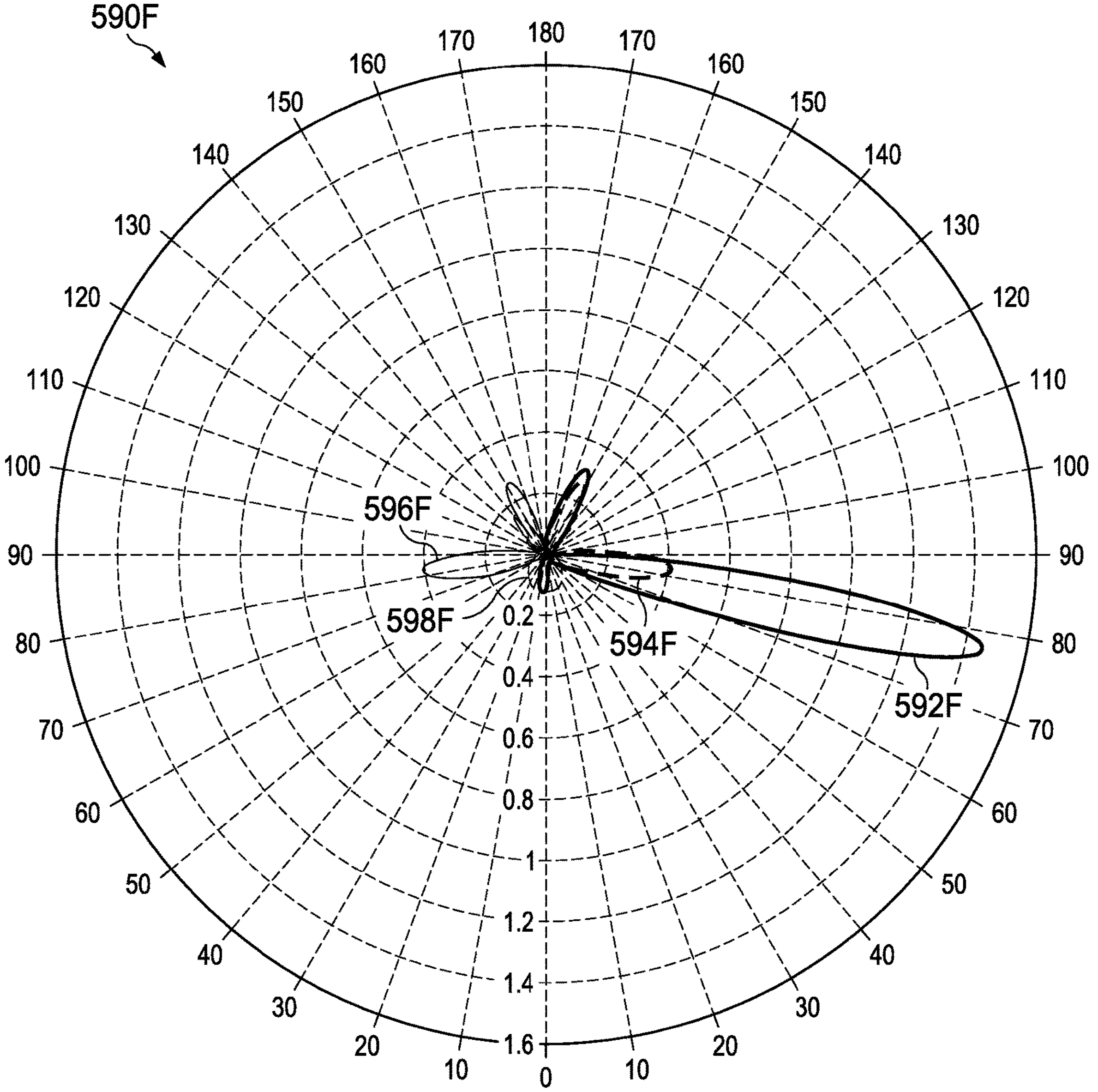
Figure 5G:
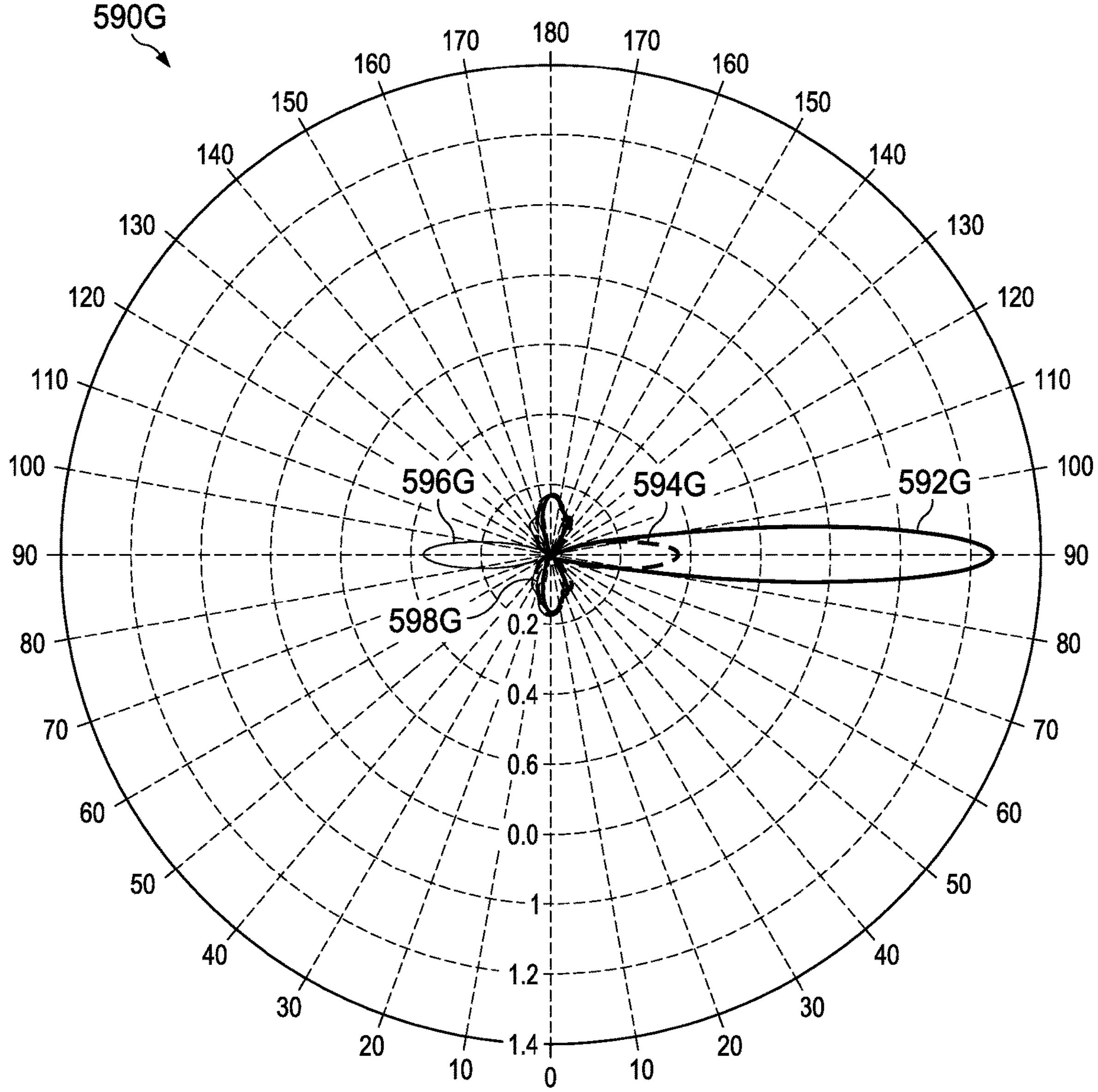

FIG. 5A shows a polar candela distribution plot 590A corresponding to far-field distributions 592A, 594A, 596A, 598A of the light output by the illumination device 400A. FIG. 5B shows a polar candela distribution plot 590B corresponding to far-field distributions of the light output by the illumination device 400B. FIG. 5C shows a polar candela distribution plot 590C corresponding to far-field distributions of the light output by the illumination device 400C. FIG. 5D shows a polar candela distribution plot 590D corresponding to far-field distributions of the light output by the illumination device 400D. FIG. 5E shows a polar candela distribution plot 590E corresponding to far-field distributions of the light output by the illumination device 400E. FIG. 5F shows a polar candela distribution plot 590F corresponding to far-field distributions of the light output by the illumination device 400F. FIG. 5G shows a polar candela distribution plot 590G corresponding to far-field distributions of the light output by the illumination device 400G.

In each of FIGS. 5A, . . . , 5G, the far-field distribution 592*j* corresponds to light emitted parallel to the (y,z)-plane, and the far-field distribution 598*j* corresponds to light emitted parallel to the (x,y)-plane, where j∈{A, B, C, D, E, F, G}. The far-field distribution 594*j* corresponds to light emitted in a plane rotated by 45° about the y-axis relative to the (x,y)-plane, and the far-field distribution 596*j* corresponds to light emitted in a plane rotated by 135° about the y-axis relative to the (x,y)-plane. For example, the far-field distribution 598*j* corresponding to light emitted parallel to the (x,y)-plane has a lobe which is broad for an angle between the emission axis 411A and the first axis 421 near zero, and which progressively decreases as the angle increases towards 90°. As another example, the far-field distribution 592*j* corresponding to light emitted parallel to the (y,z)-plane has a lobe which is oriented along the z-axis for an angle between the emission axis 411A and the first axis 421 at or near zero, and which progressively changes orientation as the angle increases towards 90°, and ends up oriented along the y-axis when the angle is at or near 90°.

Toroidal optics can also be used to control a shape and orientation of far-field distributions of emission of multiple LEEs arranged along a circular path. The position of the LEEs relative to the "latitude" on the torus gives unique beam shaping capabilities, as described below.

FIG. 6A shows a perspective view of an illumination device 600A which includes a transparent toroidal optical element 630A, and multiple LEEs 610A optically coupled with the optical element 630A and arranged to emit light along an optical axis 611A parallel to the toroidal axis 631. The toroidal optical element is also referred to as the toroidal optic. Note that illumination device 600A corresponds to a configuration of the illumination device 100 for which the LEEs 110 are arranged along a circular path, and the cylindrical optic 120 is bent onto itself to form a torus that matches the LEEs' circular path. In the example illustrated in FIG. 6A, the toroidal axis 631 and the emission axes 611A are oriented along the y-axis. In some implementations, the LEEs 610A are implemented as LEDs, and thus are configured as Lambertian emitters. The toroidal optic 630A is arranged to receive light from the LEEs 610A. Here, the toroidal optic 630A includes a groove, or corresponding indentations distributed, along the elongation thereof, and the LEEs 610A are immersion coupled with the toroidal optic 630A. In some implementations, the LEEs 610A are close coupled with the toroidal optic 630A.

In some implementations, the toroidal optic 630A is made from a plastic material, e.g., acrylic. For instance, the toroidal optic 630A have an outer diameter in a range of 50-150 mm, and a thickness in a range of 5-15 mm.

FIG. 7A shows a polar candela distribution plot 790A corresponding to far-field distributions 792A of the light output by the illumination device 600A. Here, aligning the emission axis 611A of the LEEs 610A with the toroidal axis 631 of the toroidal optic 630A can result in relatively tight emission patterns oriented along the y-axis.

FIG. 6B shows a cross-section, side view of an illumination device 600B which includes a transparent toroidal optical element 630B (also referred to as a toroidal optic), and multiple LEEs 610B optically coupled with the optical element 630B and arranged to emit light along an emission axis 611B perpendicular to the toroidal axis 631. In the example illustrated in FIG. 6B, the toroidal axis 631 is oriented along the y-axis and the emission axes 611B are oriented in the (x,z)-plane. Here, the LEEs 610B are arranged along a circular path contained in the (x,z)-plane. In some implementations, the LEEs 610B are implemented as LEDs, and thus are configured as Lambertian emitters. The toroidal optic 630B is arranged to receive light from the LEEs 610B. Here, the toroidal optic 630B includes a groove, or corresponding indentations distributed, along the elongation thereof, and the LEEs 610B are immersion coupled with the toroidal optic 630B. In some implementations, the LEEs 610B are close coupled with the toroidal optic 630B.

The toroidal optic 630B can be made from a plastic or glass material. Example toroidal optics such as 630B can have an outer diameter in a range of 50-150 mm, and a thickness in a range of 5-15 mm.

FIG. 7B shows a polar candela distribution plot 790B corresponding to far-field distributions 792B of the light output by the illumination device 600B. Here, orienting the emission axes 611B of the LEEs 610B perpendicular to the toroidal axis 631 of the toroidal optic 630B can result in a nearly perfect illumination plane that is parallel to the (x,z)-plane.

FIG. 6C shows a cross-section, side view of an illumination device 600C which includes a transparent toroidal optical element 630C (also referred to as a toroidal optic), and multiple LEEs 610C optically coupled with the optical element 630C and arranged to emit light along an emission axes 611C forming an acute angle to the toroidal axis 631. In the example illustrated in FIG. 6C, the toroidal axis 631 is oriented along the y-axis. The LEEs 610C are arranged along a circular path contained in a plane parallel to the (x,z)-plane and displaced therefrom such that the emission axes 611C form an angle Θ=80° to the toroidal axis 631. In some implementations, the LEEs 610C are implemented as LEDs, and thus are configured as Lambertian emitters. The toroidal optic 630C is arranged to receive light from the LEEs 610C. Here, the toroidal optic 630C includes a groove, or corresponding indentations distributed, along the elongation thereof, and the LEEs 610C are immersion coupled with the toroidal optic 630C. In some implementations, the LEEs 610C are close coupled with the toroidal optic 630C.

In some implementations, the toroidal optic 630C is made from a plastic material, e.g., acrylic. Example toroidal optics such as 630C can have an outer diameter in a range of 50-150 mm, and a thickness in a range of 5-15 mm.

FIG. 7C shows a polar candela distribution plot 790C corresponding to far-field distributions 792C of the light output by the illumination device 600C. Here, the lobes of the far-field distributions 792C are oriented at angles slightly smaller than 10° relative to the (x,z)-plane. Thus, orienting the emission axes 611C of the LEEs 610C at an acute angle, e.g., Θ=80°, to the toroidal axis 631 of the toroidal optic 630C can result in a far-field distribution 792C that is suitable for use as a ceiling wash. FIG. 7CC shows a total irradiance map 795C for incident flux of the light output by an illumination device 600C which has an outer diameter of 100 mm, a thickness of 10 mm and was placed at a distance of 200 mm under the ceiling.

The term "light-emitting element" (LEE), is used to define devices that emit radiation in one or more regions of the electromagnetic spectrum from among the visible region, the infrared region and/or the ultraviolet region, when activated. Activation of an LEE can be achieved by applying a potential difference across the LEE or passing an electric current through the LEE, for example. A light-emitting element can have monochromatic, quasi-monochromatic, polychromatic or broadband spectral emission characteristics. Examples of light-emitting elements include semiconductor, organic, polymer/polymeric light-emitting diodes, other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Further examples of light emitting elements include lasers and more specifically semiconductor lasers, such as vertical cavity surface emitting lasers (VCSELs) and edge emitting lasers. Additional examples include superluminescent diodes and other superluminescent devices.

A number of embodiments are described. Other embodiments are in the following claims.

What is claimed is:

1. An illumination device comprising:

a plurality of light-emitting elements (LEEs);

a transparent elongate optical element including one or more cavities arranged along an elongation direction of the optical element, wherein the optical element is arranged to receive light from the LEEs through a surface extending along the elongation direction, the surface being between the LEEs and the one or more cavities; and one or more phosphor elements arranged to receive light from the LEEs and configured to convert at least a portion of the received light into light having a second spectral power distribution different from a first spectral power distribution of the light received from the LEEs, wherein the optical element comprises one or more indentations and the phosphor elements are arranged in the one or more indentations.

2. The illumination device of claim 1, wherein the optical element is a toroidal optical element.

3. The illumination device of claim 1, wherein the one or more indentations are a groove extending in the elongation direction and the LEEs are arranged within the groove.

4. The illumination device of claim 1, wherein the LEEs are arranged on a planar substrate.

5. The illumination device of claim 1, wherein the optical element has a circular cross-section.

6. The illumination device of claim 1, wherein the one or more indentations are one groove extending along the extension of the optical element, and the one or more phosphor elements are one contiguous phosphor element arranged within the groove.

7. The illumination device of claim 1, wherein the optical element is a tubular optical element with the one or more cavities a cavity extending an entire length of the tubular optical element.

8. The illumination device of claim 7, wherein both the optical element and the one or more cavities have circular sections in planes perpendicular to the elongation direction of the optical element.

9. The illumination device of claim 7, wherein in planes perpendicular to the elongation direction of the optical element, sections of the optical element and the one or more cavities are concentric.

10. The illumination device of claim 7, wherein each of the one or more cavities has a circular cross-section.

11. The illumination device of claim 7, wherein in planes perpendicular to the elongation direction of the optical element, sections of the optical element and the one or more cavities are eccentric.

12. The illumination device of claim 11, wherein the optical element has a central axis extending along the elongation direction and a center of the one or more cavities is offset from the central axis in a radial direction towards the LEEs.

13. The illumination device of claim 12, wherein the optical element has a central axis extending along the elongation direction and a center of the one or more cavities is offset from the central axis in a radial direction towards the LEEs.

* * * * *